United States Patent [19]

Slocum

[11] Patent Number: 5,270,947
[45] Date of Patent: Dec. 14, 1993

[54] FLUID STATUS DETECTION SYSTEM

[75] Inventor: Laurence S. Slocum, Indianapolis, Ind.

[73] Assignee: Emerson Electric Co., St. Louis, Mo.

[21] Appl. No.: 587,932

[22] Filed: Sep. 25, 1990

[51] Int. Cl.⁵ ............................................. G06F 15/20
[52] U.S. Cl. ..................... 364/510; 340/521; 340/522
[58] Field of Search ............... 364/510, 558; 73/49.2; 340/521, 522

[56] References Cited

U.S. PATENT DOCUMENTS

| | | | |
|---|---|---|---|
| 4,527,250 | 7/1985 | Galdun et al. | 364/189 |
| 4,736,193 | 4/1988 | Sloum et al. | 340/603 |
| 4,740,777 | 4/1988 | Sloum et al. | 73/49.2 T |
| 4,831,360 | 5/1989 | Clarkson et al. | 73/49.2 T |
| 4,835,522 | 5/1989 | Andrejasich et al. | 73/49.2 T |
| 4,855,714 | 8/1989 | Clarkson et al. | 73/49.2 T |
| 4,910,658 | 3/1990 | Dudash et al. | 364/188 |
| 5,066,944 | 11/1991 | Slocum | 73/49.2 T |

*Primary Examiner*—Jack B. Harvey
*Assistant Examiner*—Ellis B. Ramirez
*Attorney, Agent, or Firm*—Robert F. Meyer; Eric R. Waldkoetter

[57] ABSTRACT

A fluid status detection system includes a plurality of probes connected to a controller capable of being operated in a plurality of different operation modes. The controller includes a display and ten key switches adjacent the display. Software divides the screen into ten key label areas, each adjacent one of the key switches. Other programming assigns different labels to each key in different operation modes. One key will advance the system and display to a different menu depending on the mode. Another key will provide different help messages depending on the mode. When help is requested, the current display is saved and then restored when the help message is exited. The system beeps if an inappropriate key is pushed in any mode.

12 Claims, 33 Drawing Sheets

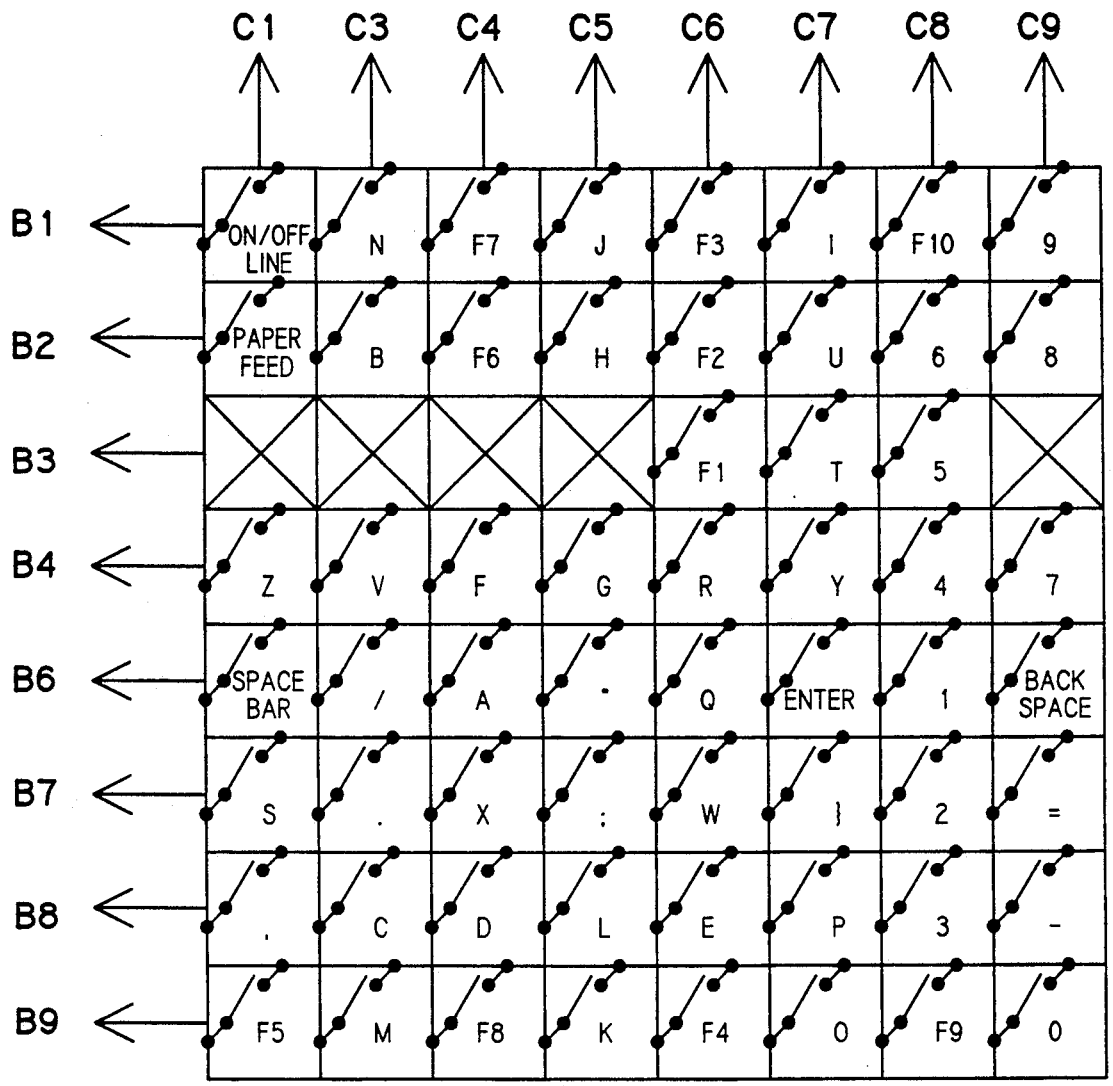
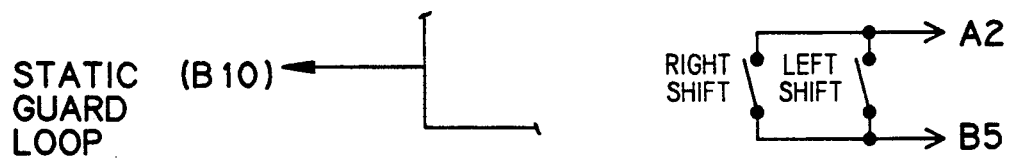
FIG. 5

```
┌─[F1]──[F2]──[F3]──[F4]──[F5]─────────┐
│                                       │
│ SYSTEM CONFIG HELP:   01/05/90  13:30:45 │
│                                       │
│ F1 = STATION ID: ALLOWS INPUT OR EDIT OF 4 LINES OF
│      TEXT. 32 CHARACTERS EACH. THE STATION ID IS USED
│      AS A HEADER FOR ALL REPORTS AND SERIAL COMM.
│
│ F2 = PASSWORD: ALLOWS INPUT OR EDIT OF 5 PASSWORDS.
│      THESE PASSWORDS PROVIDE SECURE ACCESS TO 4 SYSTEM
│      FUNCTIONS: REPORTS, TEST, PROGRAM, AND RS-232.
│      ONCE A PASSWORD HAS BEEN ENTERED, ACCESS IS
│      RESTRICTED TO THE SELECTED FUNCTION. A 5TH MASTER
│      PASSWORD MAY BE ENTERED WHICH ALLOW ACCESS TO ALL
│      FUNCTIONS. A PASSWORD MAY BE REMOVED BY EDITING
│      THE DESIRED PASSWORD TO A BLANK LINE.
│
│ PRESS (F10) TO EXIT OR (F9) FOR MORE ...
│                                       │
│                          ┌──────┬─────┤
│                          │ MORE │ GO  │
│                          │      │ BACK│
└──[F6]──[F7]──[F8]────────[F9]───[F10]─┘
```

FIG. 9

| SIGNAL TYPE PRIORITY<br>(HIGHEST PRIORITY AT TOP) | PROBE NUMBER PRIORITY<br>(HIGHEST PRIORITY AT LEFT) |
|---|---|
| FAIL | OVERFILL, 1, 2, .. 31 |
| OIL | OVERFILL, 1, 2, .. 31 |
| WET | OVERFILL, 1, 2, .. 31 |
| DRY | OVERFILL, 1, 2, .. 31 |
| SSI | 1, 2, 3, ... 8 |

| F1 | F2 | F3 | F4 | F5 | | | | | F10 |
|---|---|---|---|---|---|---|---|---|---|
| NEXT RELAY | TOGGLE ENABLE | TOGGLE REFLASH | TOGGLE DEFAULT | | | | | | GO BACK |

CONFIGURE RELAYS: 01/05/90  13:30:45

RELAY NUMBER:    1
ENABLED:         YES
REFLASH:         NO
DEFAULT STATE:   NORMALLY CLOSED

| F6 | F7 | F8 | F9 |
|---|---|---|---|
| | | | HELP |

| F1 | F2 | F3 | F4 | F5 |
|---|---|---|---|---|
| MOVE UP | MOVE DOWN | MOVE LEFT | MOVE RIGHT | TOGGLE |

```
CONFIGURE RA PROBES:    01/05/90  13:30:45

RA PROBE NUMBER: OVERFILL
TYPE:            FD-200HLRA    TANK:
ENABLED:         YES           ZONE:
ALARMS ON:       LEAK FAIL

RELAYS ATTACHED            RELEASE CONDITION
              11                           11
         1234567890 1               1234567890 1
FAIL   [] D E  D E                  C B    C  A
LEAK       FLASHING
           CURSOR
_____
A = ACK'D. B = BOTH ACK'D & CLEAR. C = EVENT CLEAR.
D = RELAY IS DISABLED. E = RELAY IS ENABLED
```

| F6 | F7 | F8 | F9 | F10 |
|---|---|---|---|---|
|  |  |  | HELP | GO BACK |

FLUID STATUS DETECTION SYSTEM

BACKGROUND OF THE INVENTION

1. Field of the Invention

The present invention in general relates to fluid detection systems that include a central controller and a plurality of probes remote from the controller for detecting the fluid status at the probe locations, and more particularly to such a system that is programmable and can operate in several different operation modes.

2. Description of the Prior Art

Fluid detection systems that include a central controller and numerous probes that are controlled by the controller and report on the fluid status at remote probe locations are well known. Typically such systems are used to detect leaks in underground hydrocarbon tanks. U.S. Pat. No. 4,736,193 on an invention of Laurence S. Slocum and Sara M. Mussmann describes such a fluid detection system that is programmable and capable of operation in several different operation modes. The detection system includes a display on which different information is displayed depending on the operation mode. The system also includes a keyboard with which the operation mode may be changed and which also may be used to select alarm and relay latching conditions individually for each of many probes and relays from a variety of different conditions. In this and other prior art systems the messages that can be provided on the display are limited so that it is necessary to refer to a manual to program the system. Since the consequences of misprogramming such a system can be significant, and since such systems often are used by service station personnel and others that might not be technically proficient, it would be useful to have a system that leads the operator through the programming.

SUMMARY OF THE INVENTION

It is an object of the invention to provide a fluid detection system that overcomes one or more of the disadvantages of prior art fluid detection systems.

It is a further object to provide the above object in a fluid detection system in which the function of important keys are automatically pointed out to the user.

It is still a further object of the invention to provide one or more of the above objects in a fluid detection system in which the use of function keys changes with the operation and such changes are pointed out to the user.

It is another object of the invention to provide a fluid detection system that provides one or more of the above objects and in which the user is informed if an inappropriate key is pushed.

It is yet another object of the invention to provide a fluid detection system that provides one or more of the above objects and which provides a variety of different help messages that are specifically applicable to the current operation mode.

The invention provides a fluid status detection system comprising: a controller capable of being operated in a plurality of different operation modes, and a plurality of probes for sensing the status of fluids at probe locations remote from the controller, each of the probes including means for providing a probe signal to the controller indicative of the fluid status at the probe location, the controller comprising: a display; a plurality of key switches adjacent the display; key label means for providing labels for the key switches at locations on the display adjacent the key switches; label change means for changing the labels at one or more of label locations when the operation mode of the controller changes. Preferably, the key label means comprises: key label outline means for defining the label locations, and means for writing text on the display at the label locations. Preferably the system further includes indicating means for indicating when a key switch is activated that is inappropriate in the operation mode in which the system is in. Preferably the indicating means comprises an audio means for providing an audio signal. Preferably, one of the labels is a help label and wherein the system further includes help means for providing a different help message in each of the operation modes when the key switch adjacent the help label is activated. Preferably, the help means includes means for saving whatever is displayed on the display when the key adjacent the help label is activated. Preferably, one of the labels is a operation mode label which indicates a operation mode different than the current operation mode and the system further includes mode change means for causing the system to change to the mode indicated on the label when the key switch adjacent the operation mode label is activated. Preferably, the system further includes means for changing the menu on the display when the operation mode is changed. Preferably, one of the labels comprises a go back label, and the system further includes a go back means for causing the system to return to a mode in which it was previously and the display to return to the display previously displayed in the previous mode when the key switch adjacent to the go back label is activated.

In another aspect the invention provides a fluid status detection system comprising: a controller capable of being operated in a plurality of different operation modes, and a plurality of probes for sensing the status of fluids at probe locations remote from the controller, each of the probes including means for providing a probe signal to the controller indicative of the fluid status at the probe location, the controller comprising: a display; and help means for providing a different help message on the display in each of the different operation modes. Preferably, the help means includes display save means for saving the screen displayed on the display when the help means is activated. Preferably, the help means further includes display restoring means for restoring the saved screen to the display after the help message is removed.

The invention not only provides a fluid detector that is easier to accurately program, but also provides more flexibility in their responses available, further enhancing the effectiveness of the fluid detection system. Numerous other features, objects and advantages of the invention will become apparent from the following description when read in conjunction with the accompanying drawings.

BRIEF DESCRIPTION OF THE DRAWINGS

In the drawings:

FIG. 5 shows the keyboard switch network truth table of the embodiment of FIG. 1;

FIG. 9 shows the display for the preferred embodiment of the first page of the system configuration program help message.

FIG. 15 shows the display for selecting the release and relatch function;

FIG. 17 shows the display and function keys for programming the preferred relay deactivation conditions.

DESCRIPTION OF THE PREFERRED EMBODIMENT

Figure 1:
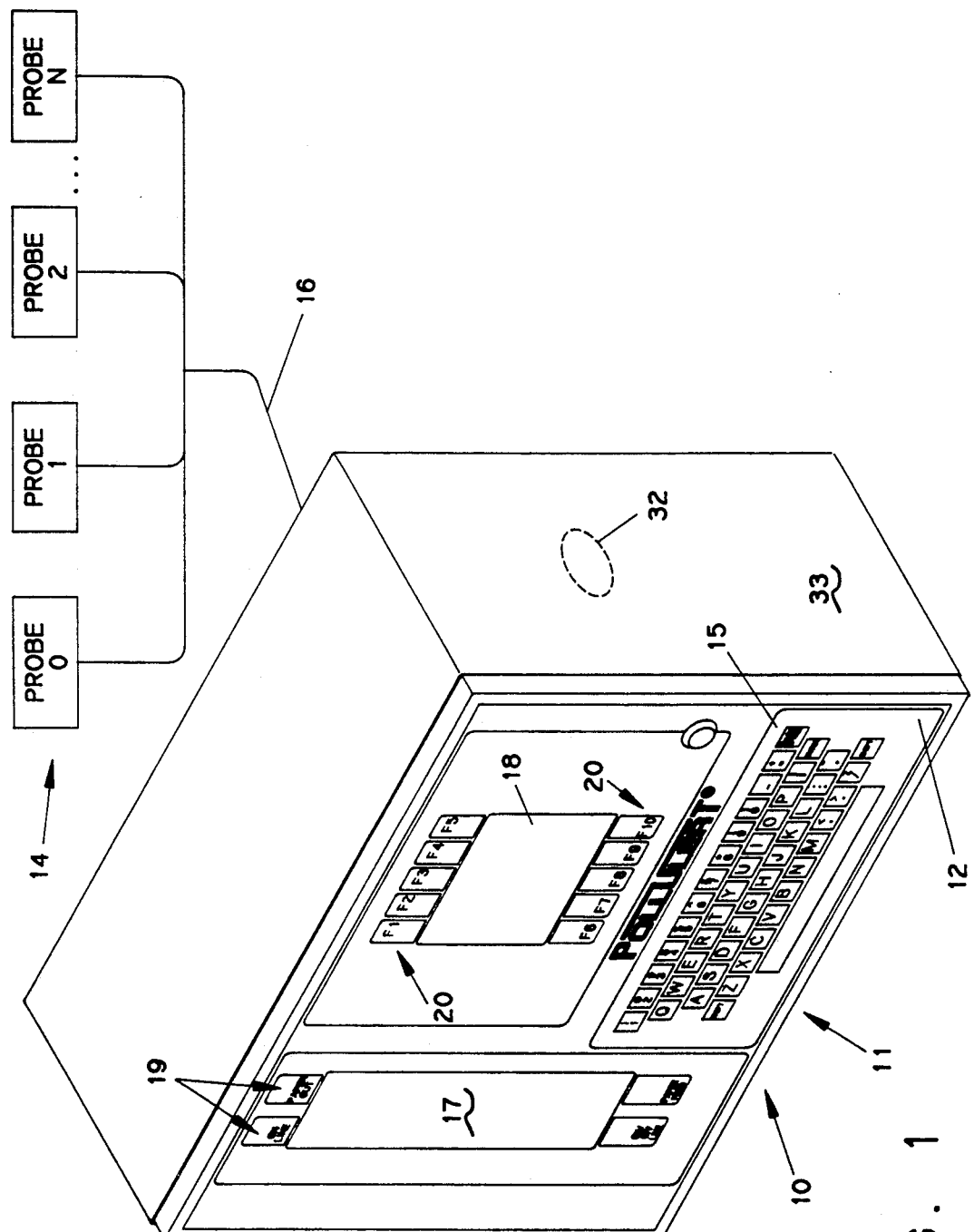
FIG. 1 shows the preferred embodiment of a fluid detection system according to the invention including a perspective view of the controller and a diagrammatic view of n probes.

Turning attention to the drawings, FIG. 1 shows the preferred embodiment of a fluid detection system 10 according to the invention. It should be understood that the particular embodiment described below is exemplary of the invention only, and is not intended to limit the invention. The system 10 includes a controller 12 and a multiplicity of probes 14 which are located remotely from the controller 12. The probes 14 are connected to the controller 12 via a cable 16. The probes 14 will not be discussed in detail herein, and can be any one of a variety of fluid probes, such as those produced by Pollulert Systems, P.O. Box 706, Indianapolis, Ind. 46206. The controller is capable of operating in a plurality of modes, such as a mode in which the system is configured, and a mode in which the probes are monitored. The controller 12 includes a dot matrix printer 17, a display 18, and a keyboard system 11 which incudes a full ASCII keyboard 15 and plurality of key switches 20 adjacent the display. The controller also includes a central processing unit 24 (FIG. 2F), a memory 70 (FIGS. 2C and 2D) and associated circuitry (FIGS. 2A through 2H) which are programmed to produce labels 25 comprising lines 26 (FIG. 7) defining ten label areas, such as 27, on the display 18, and text, such as 29, within the label areas, which text may change as when the operation mode is changed. Compare for example, the different texts displayed in the main menu mode, shown in FIG. 7, and the help mode in the system configuration menu shown in FIG. 9. If a key 20 that is inappropriate for any particular operation mode is pressed, a beep is emitted by an audio transducer 32 mounted within the controller cabinet 33 (FIG. 1).

Figure 2A:
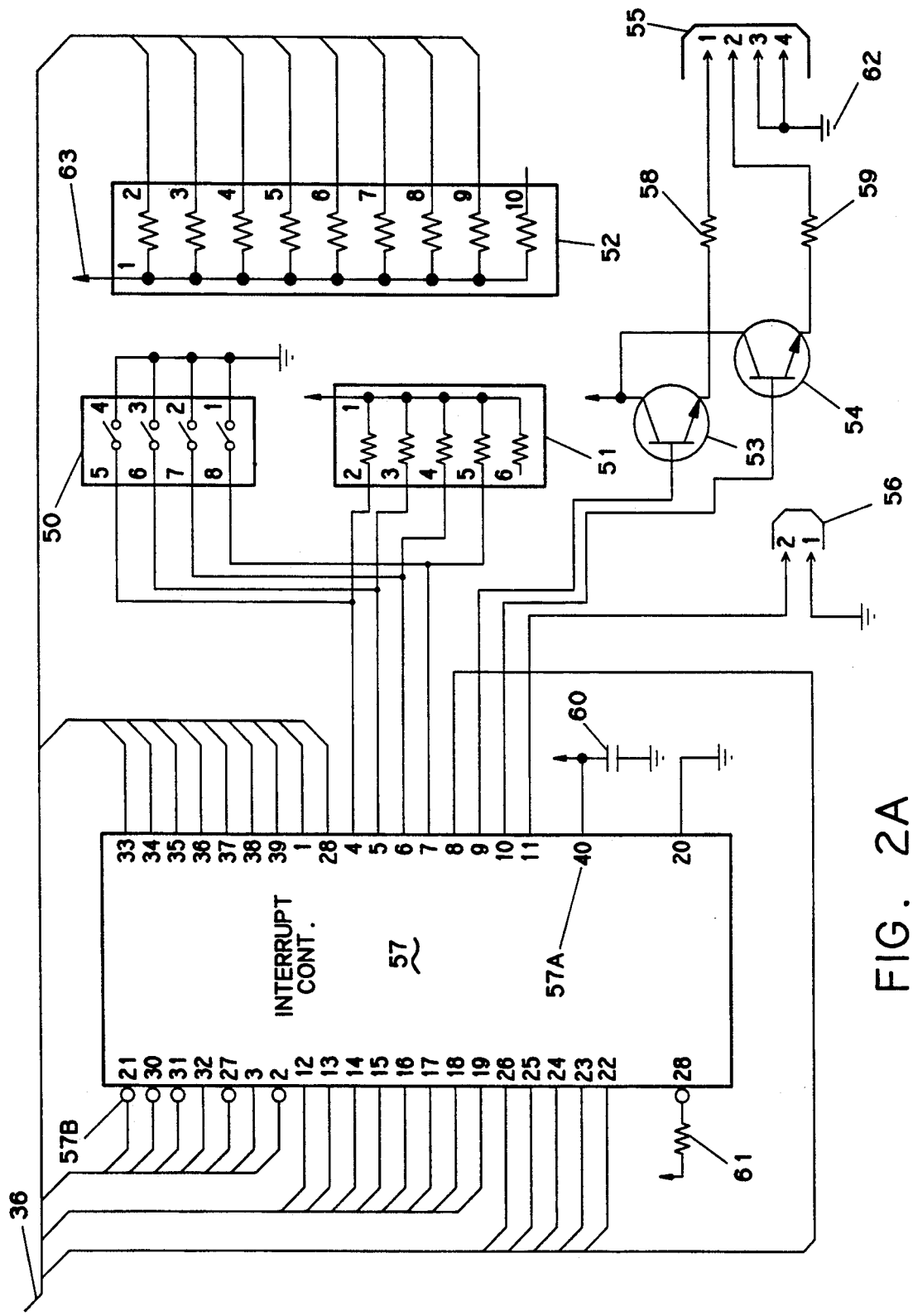
FIGS. 2A through 2H show an electrical circuit diagram of the central processing unit circuit board of the preferred embodiment of a fluid detection system according to the invention.
Figure 2B:
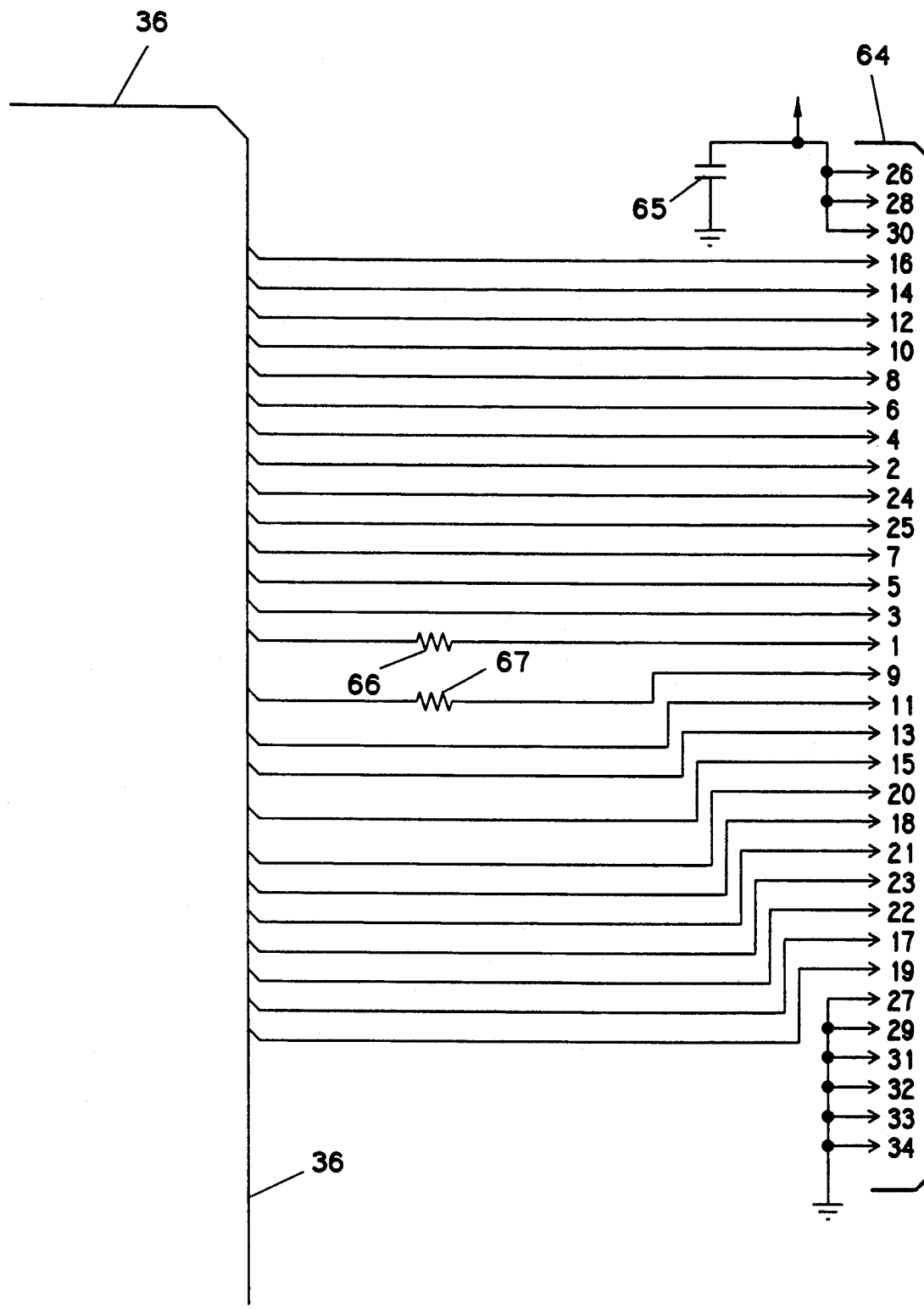
Figure 2C:
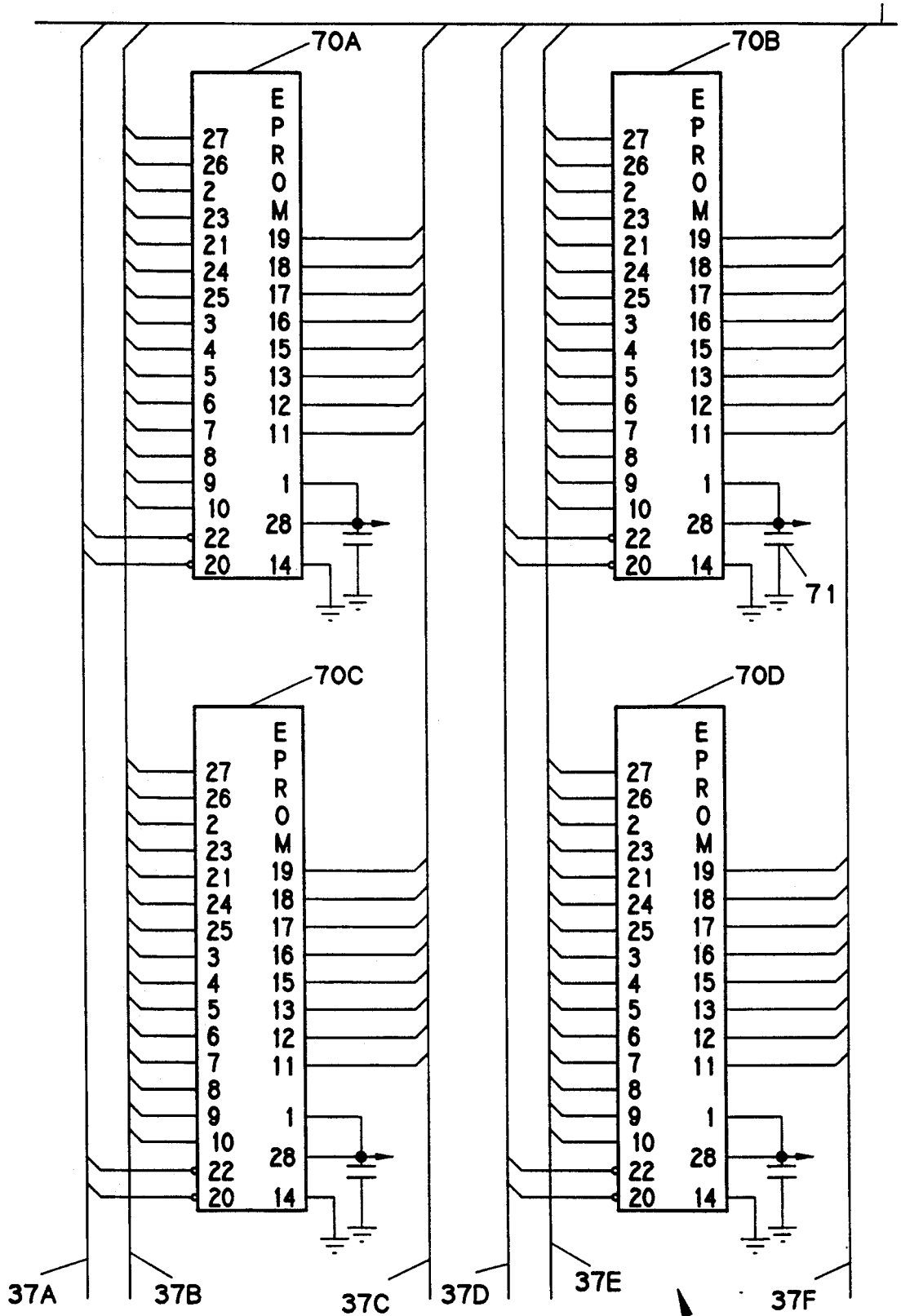
Figure 2D:
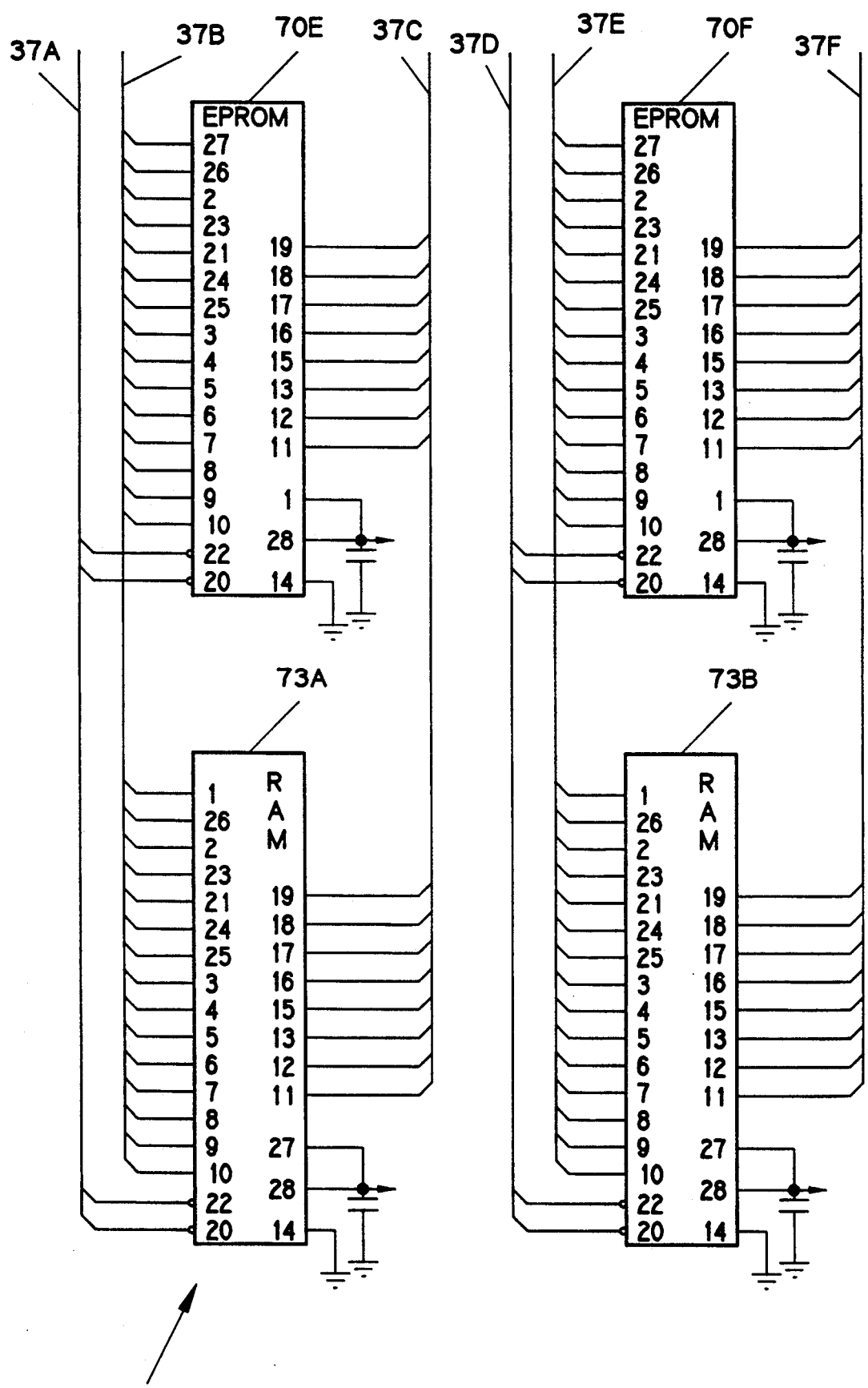

Turning now to a more detailed description of the invention, the preferred embodiment of the electronic circuit of the invention is shown in FIGS. 2A through 5. FIGS. 2A through 2H show the central processing unit circuit board, FIGS. 3A through 3F show the input/output circuit board, FIGS. 4A through 4E show the relay/solid state input circuit board, and FIG. 5 shows the keyboard circuit There is also an interface circuit between the controller and the probes, however this circuit is conventional and will therefore not be discussed in detail. Turning to FIGS. 2A through 2H, we shall first describe how these FIGS. are interconnected, and then discuss the details of each. FIG. 2A is connected to FIG. 2B via cable 36, and is in turn connected to FIG. 2C via the same cable. If FIG. 2D is placed below FIG. 2C the connections of the two via cables 37A through 37F become clear. FIG. 2E connects to FIG. 2C via cable 36 and connects to FIG. 2F via cable 38A. A set of three electrical lines 39A and another set of three lines 39B as well as cable 40 are shown at both the left of FIG. 2E and the right of FIG. 2G making the connections between these two FIGS. clear. FIG. 2G connects to FIG. 2F via lines 41 which connect to the left side of CPU 24, and also via the three lines 43A, 43B, and 43C. FIG. 2H connects to FIG. 2G via cable 44. FIG. 2H connects to FIG. 2F via lines 45A, 45B, 46A, 46B, 46C, 47 and 48.

Figure 2E:
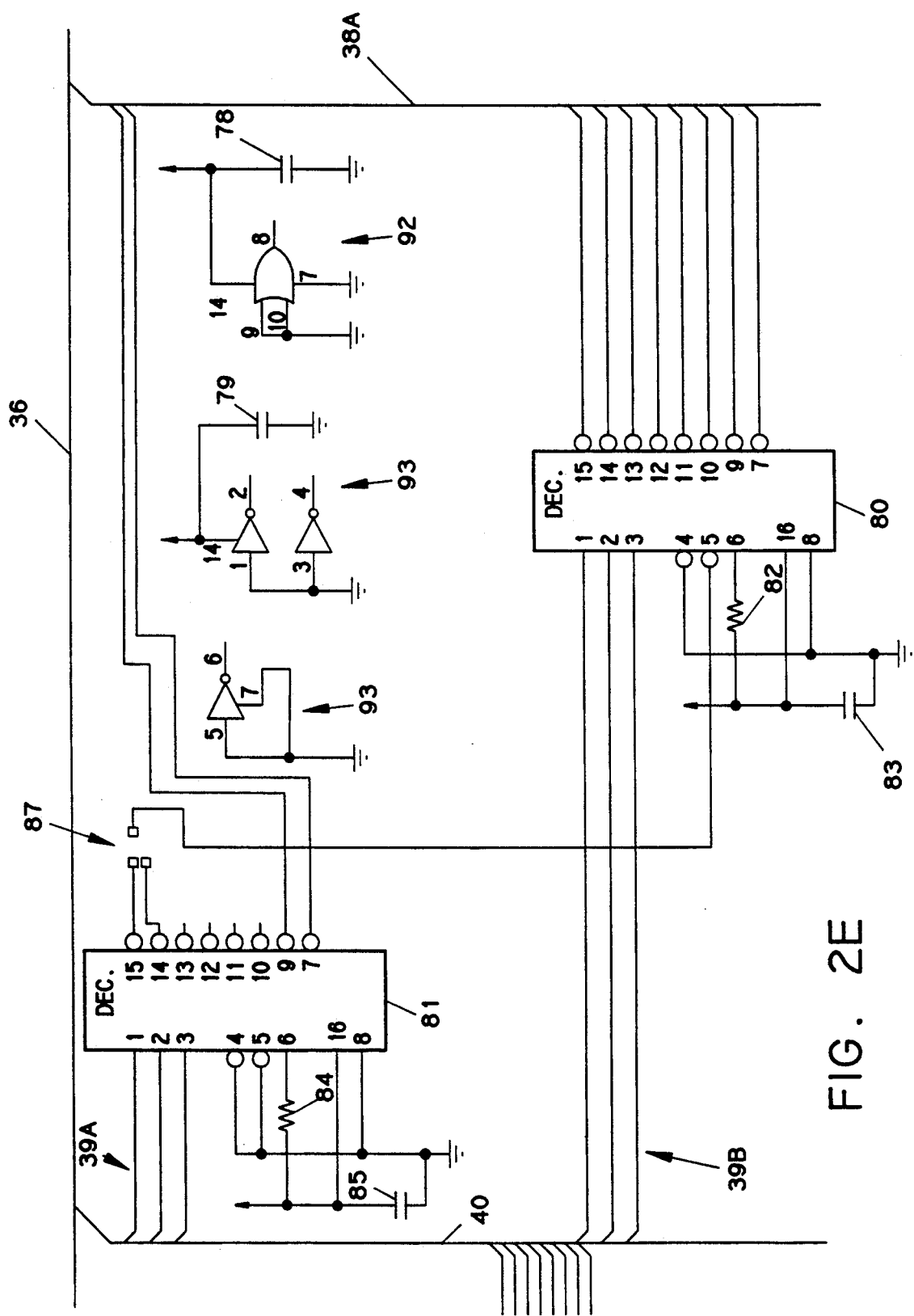
Figure 2F:
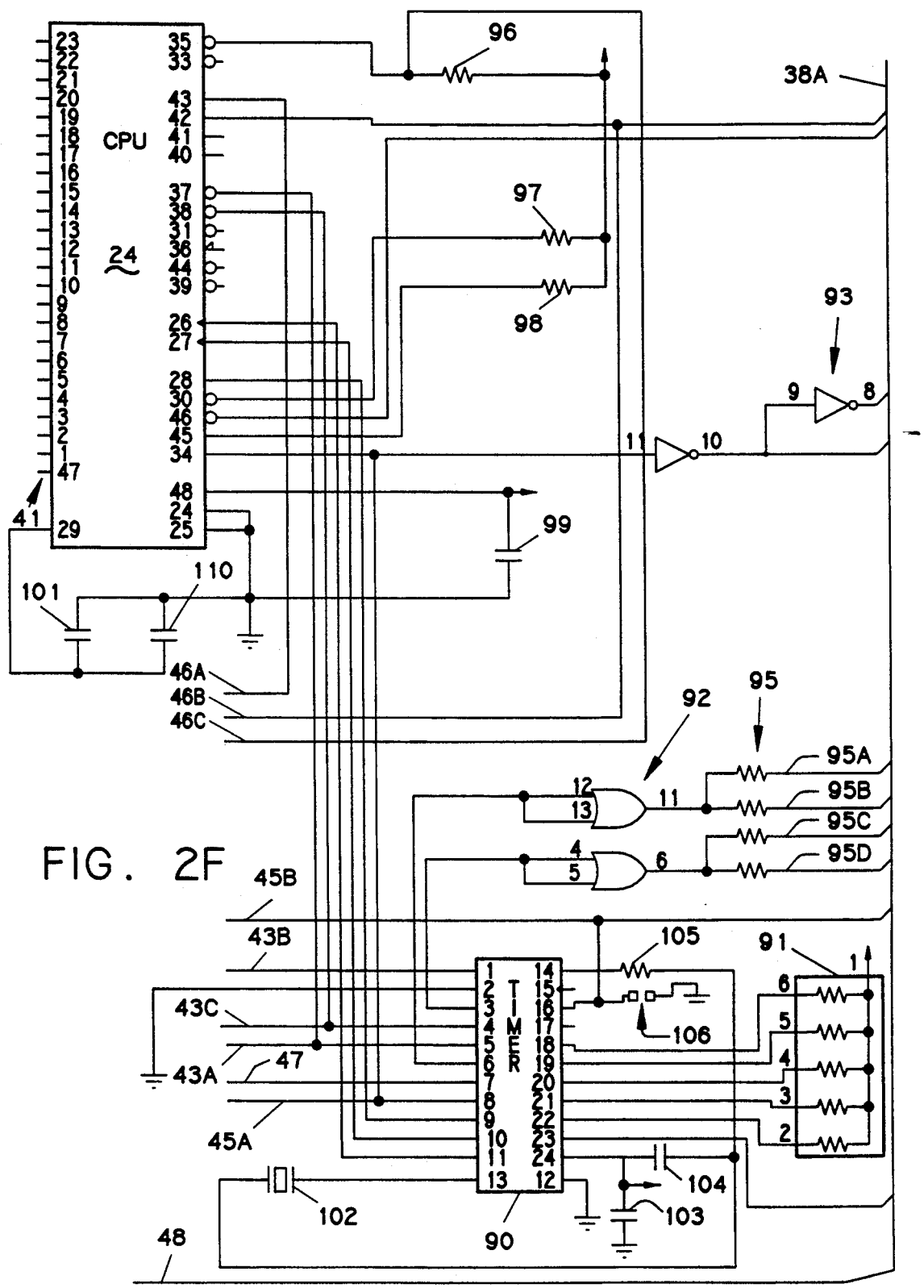
Figure 2G:
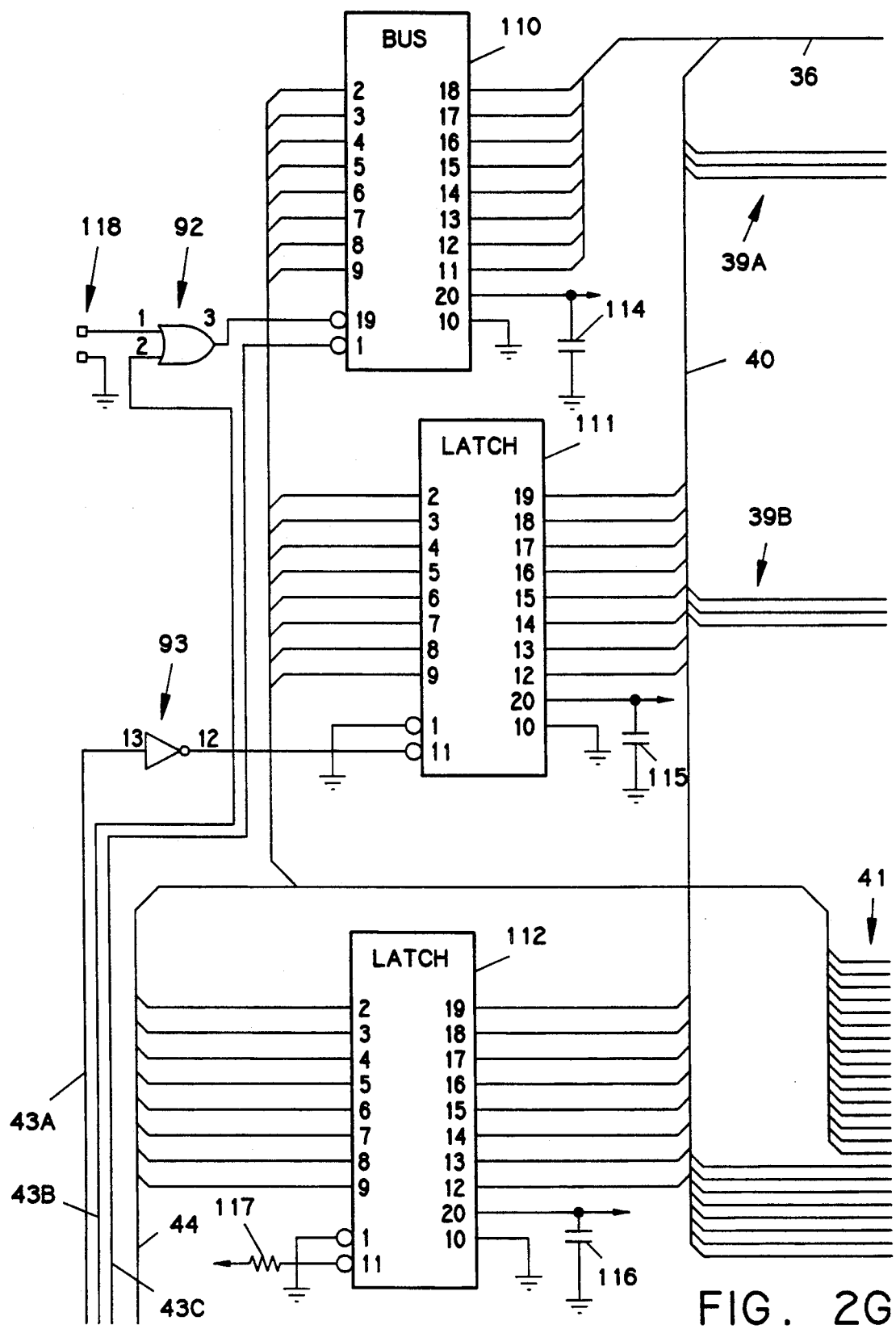
Figure 2H:
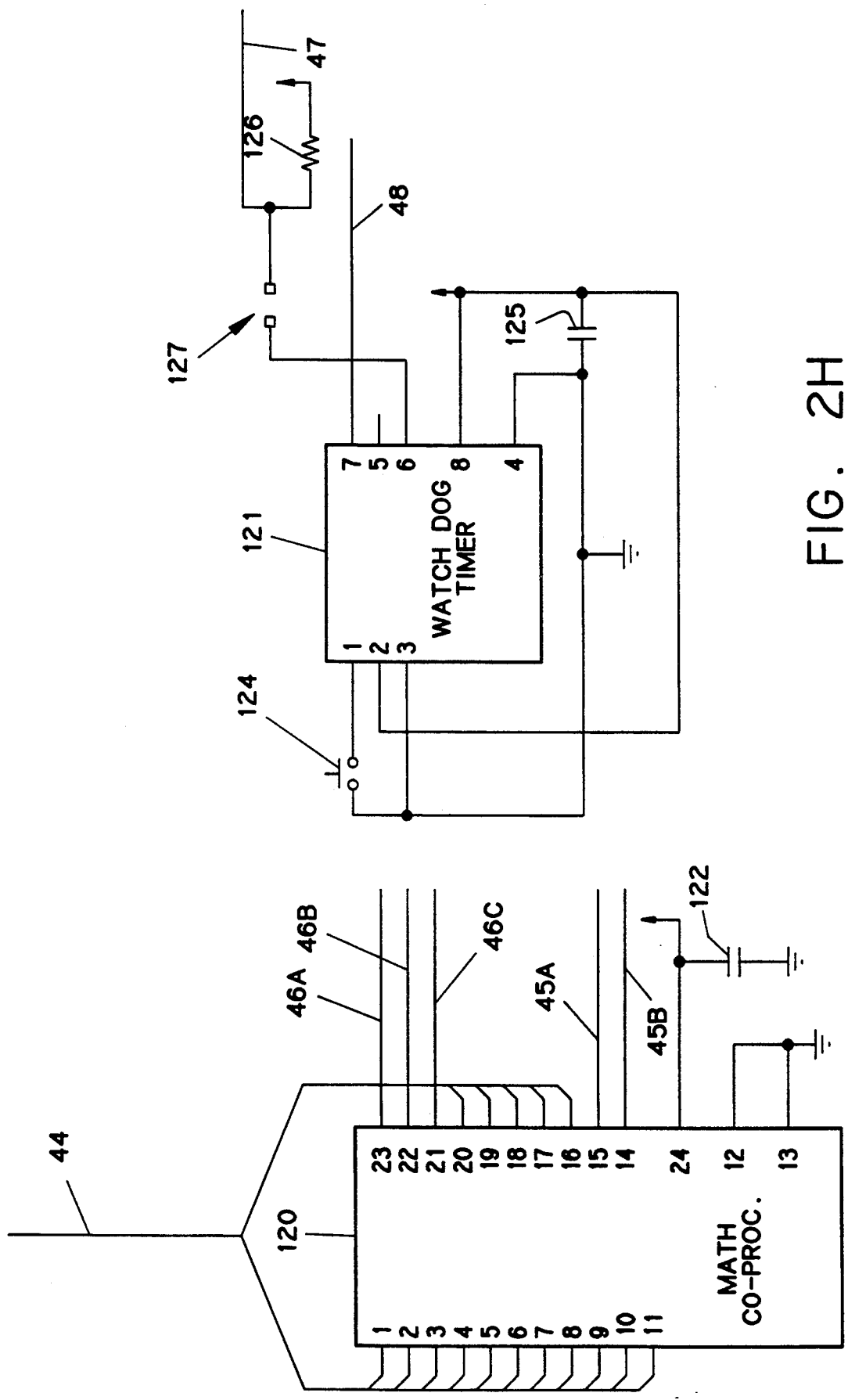

Turning now to the individual parts of the circuit mounted on or forming part of the CPU circuit board include in FIG. 2A, four position dip switch 50, resistor block 51 with five 10 Kohm resistors, resistor block 52 with nine 10 Kohm resistors, PN2222 NPN transistors 53 and 54, terminals 55 and 56, type 32202 interrupt controller 57, 150 ohm resistors 58 and 59, 0.1 microfarad capacitor 60, and 10 Kohm resistor 61. Throughout the electrical circuits discussed herein, a ground symbol, such as at 62, denotes a connection to ground while an arrow, such as at 63 denotes a connection to the positive five volt power supply. In addition, each electrical circuit element, such as the interrupt controller 57, includes the pin numbers, such as pin number 40 shown at 57A. Each of these electrical circuit elements are conventional and readily attainable at most electrical supply sources, and each comes with literature describing it and its function in detail. Thus the details will not be discussed herein. When a circle, such as 57B, is shown at a pin number, it means the connection to the pin is inverted. The interrupt controller 57 provides interrupt, timer and counter functions for the CPU, the dip switch 50 clears the memory, the terminal 55 connects to the status LEDs such as 19 on the front of the case (FIG. 1), and the terminal 56 connects to the audio transducer 32. Turning to FIG. 2B, the circuit includes connector 64, 10 microfarad capacitor 65, and 10 Kohm resistors 66 and 67. Connector 65 connects to the input/output circuit board (FIG. 3D). Continuing on to FIGS. 2C and 2D, the circuit includes type 27256 32 kilobyte EPROMs 70A through 70F, type 84256 32 kilobyte RAMs 73A and 73B. Each of the EPROMs 70A through 70F and the RAMs are connected to ground through a 0.1 microfarad capacitor such as 71. Turning to FIG. 2E, the electrical parts include type 74ALS138 3 line to 8 line decoders 80 and 81, 10 Kohm resistors 82 and 84, 0.1 microfarad capacitors 78, 79, 83, and 85, and jumper terminals 87. The elements 92 and 93 floating free in the central part of the figure represent unused portions of a quad OR chip 92 and a hex inverter chip 93, which will be discussed below, and are shown for schematic completeness. In FIG. 2F the electrical components are a type 32008 central processing unit 24 and a type 32201 timing and control chip which comes with the 32008 as part of a set, resistor block 91 with five 10 Kohm resistors, a quad OR gate chip 92 with four two-input OR gates, a hex inverter chip 93, four 47 ohm resistors 95, 10 Kohm resistors 96, 97, and 98, 0.1 microfarad capacitor 99, 0.001 microfarad capacitor 100, 1 microfarad capacitor 101, 20 MHZ oscillator 102, 0.1 microfarad capacitor 103, 30 picofarad capacitor 104, 470 ohm resistor 105, and jumper terminal 106. The electrical components in FIG. 2G include type 74ALS245 octal data bus transceiver 110, type 74ALS73 eight-bit latches 111 and 112, 0.1 microfarad capacitors 114, 115, and 116, 10 Kohm resistor 117, jumper terminal 118, and a gate from the each of the quad OR chip 92 and hex inverter chip 93. Turning to FIG. 2H, the components include type 32081 math co-processor 120, type DS1232 watch-dog timer and power supply monitor 121, 0.1 microfarad capacitors 122 and 125, switch 124, 10 Kohm resistor 126, and jumper terminal 127.

Figure 3A:
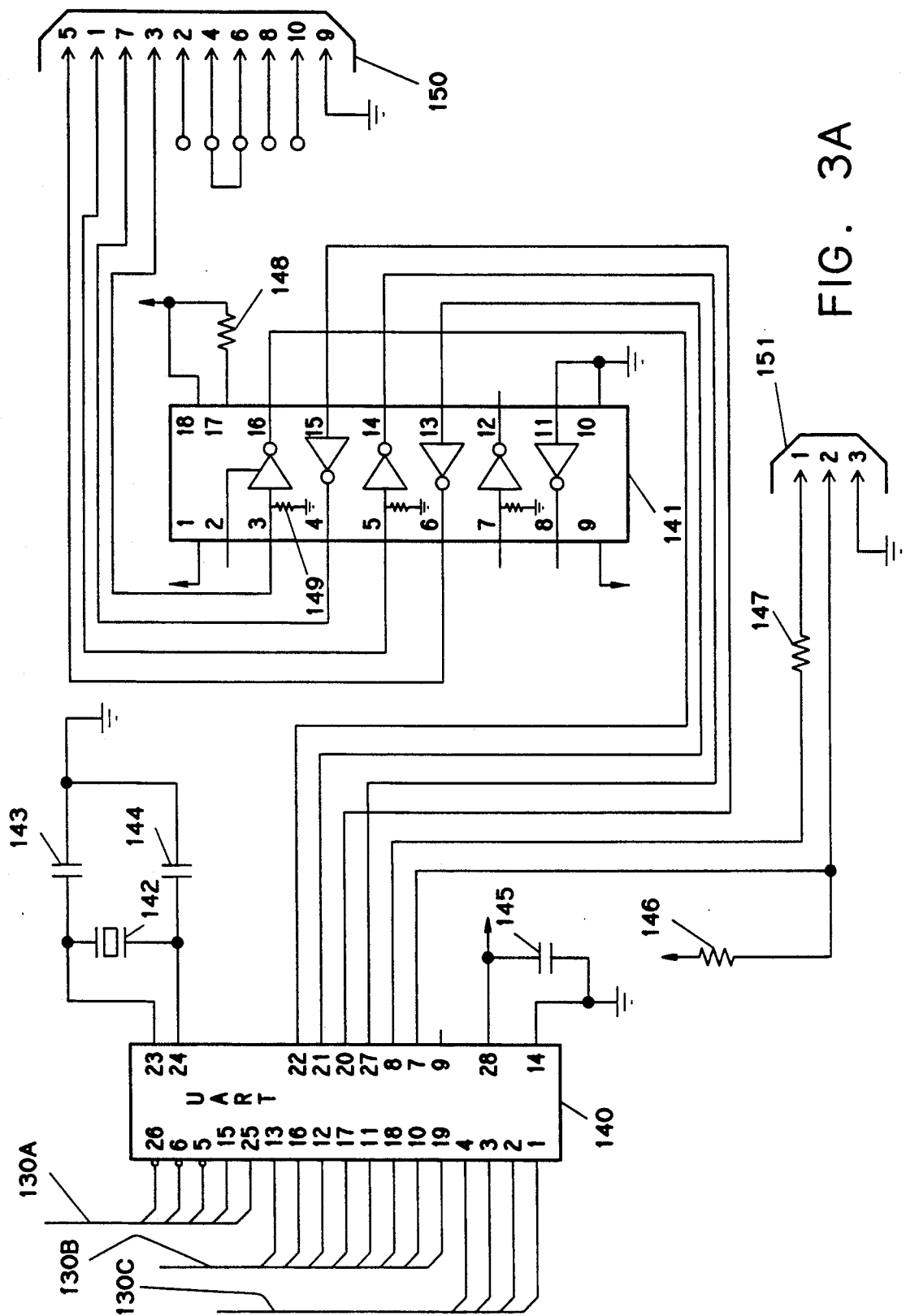
FIGS. 3A through 3F show an electrical circuit diagram of the input/output circuit board according to the preferred embodiment of the invention.
Figure 3B:
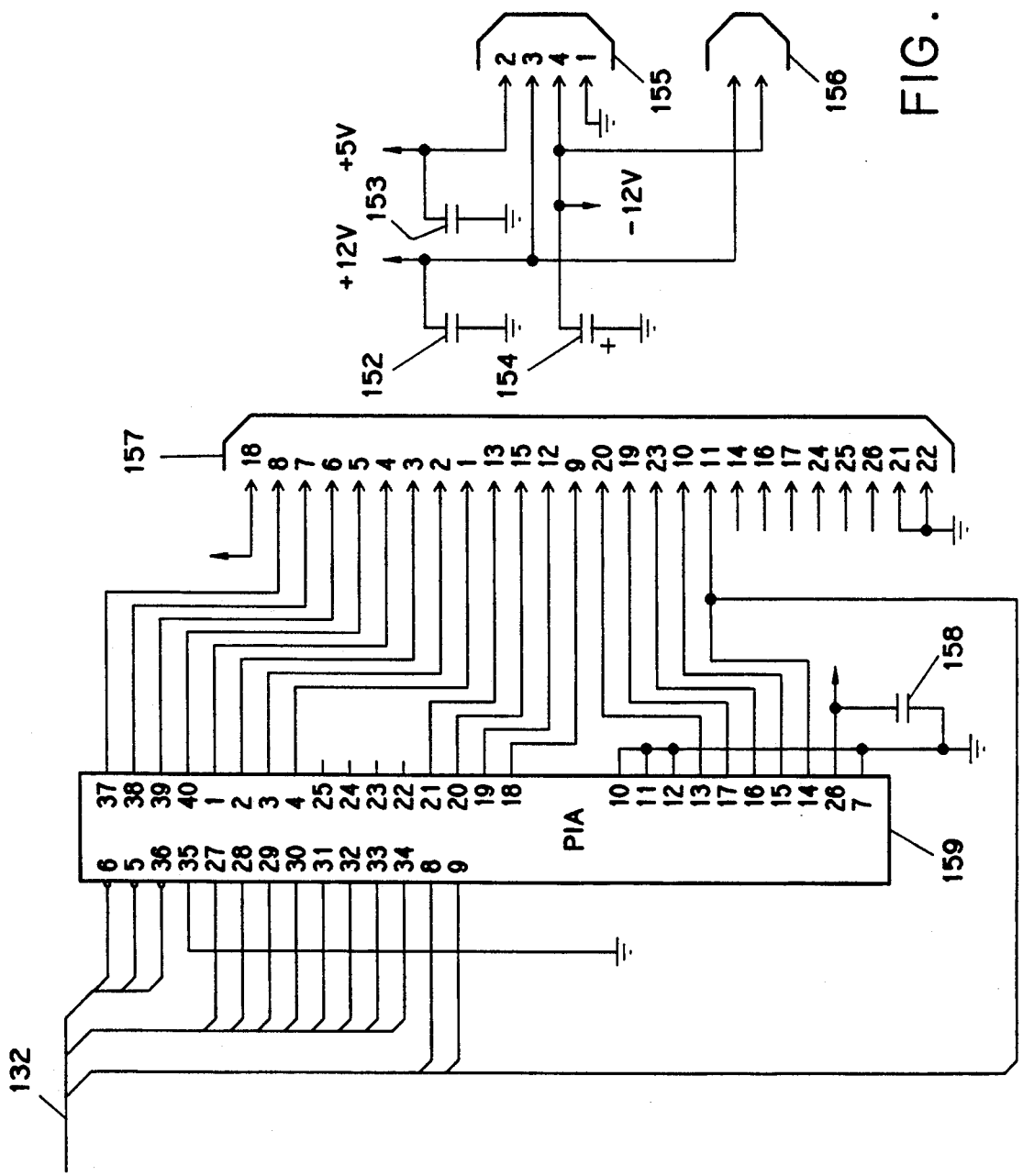
Figure 3C:
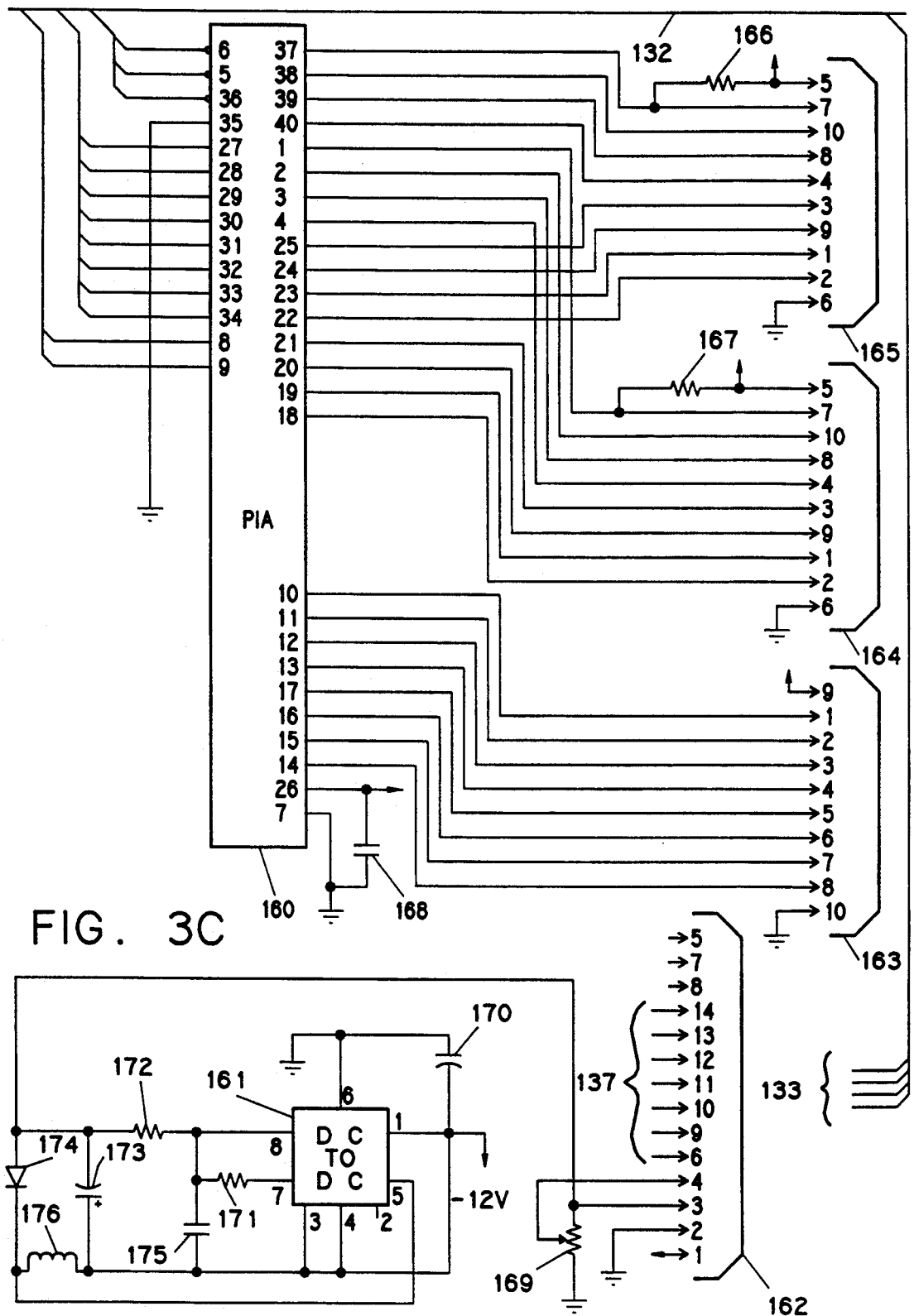
Figure 3D:
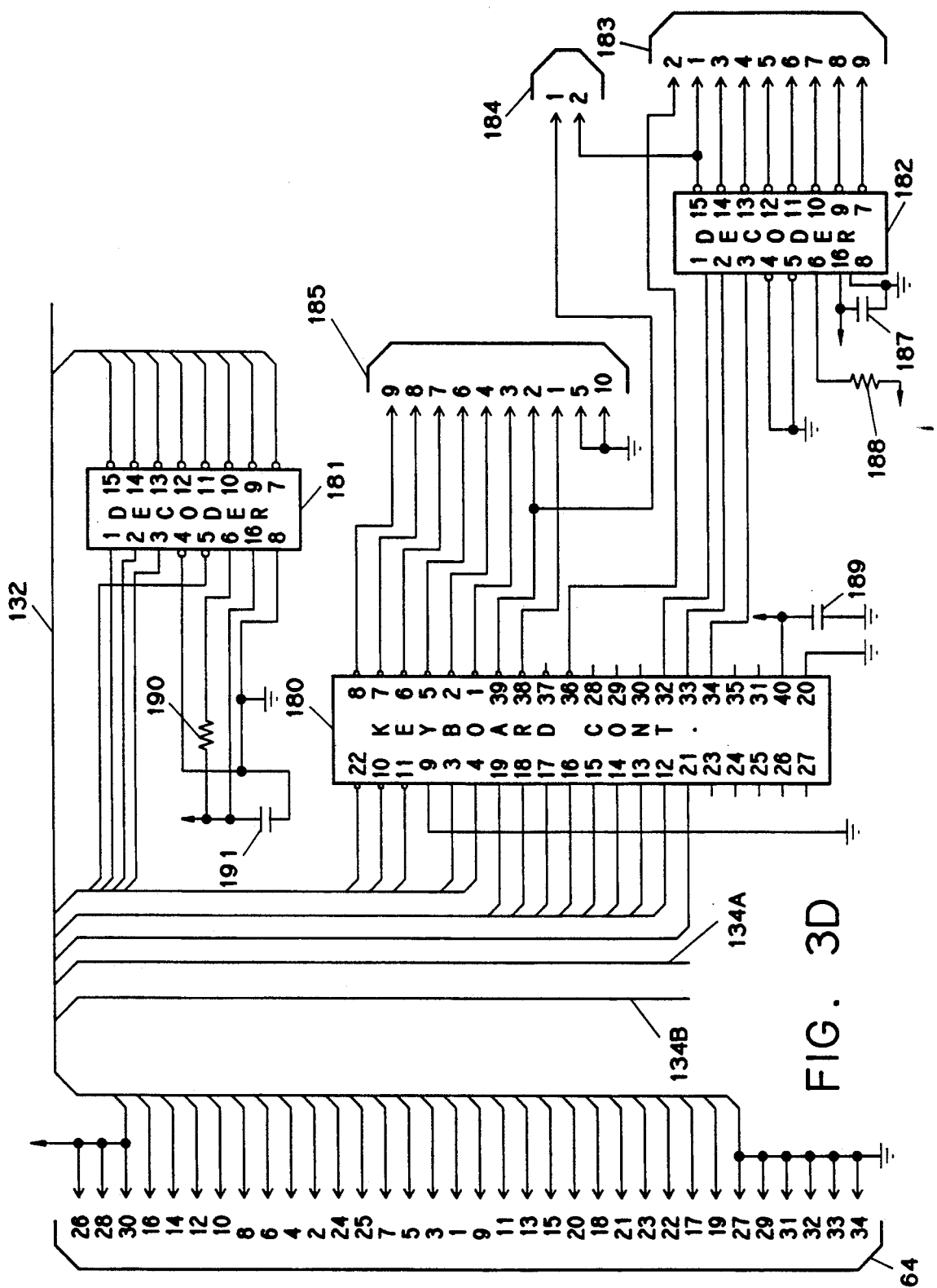
Figure 3E:
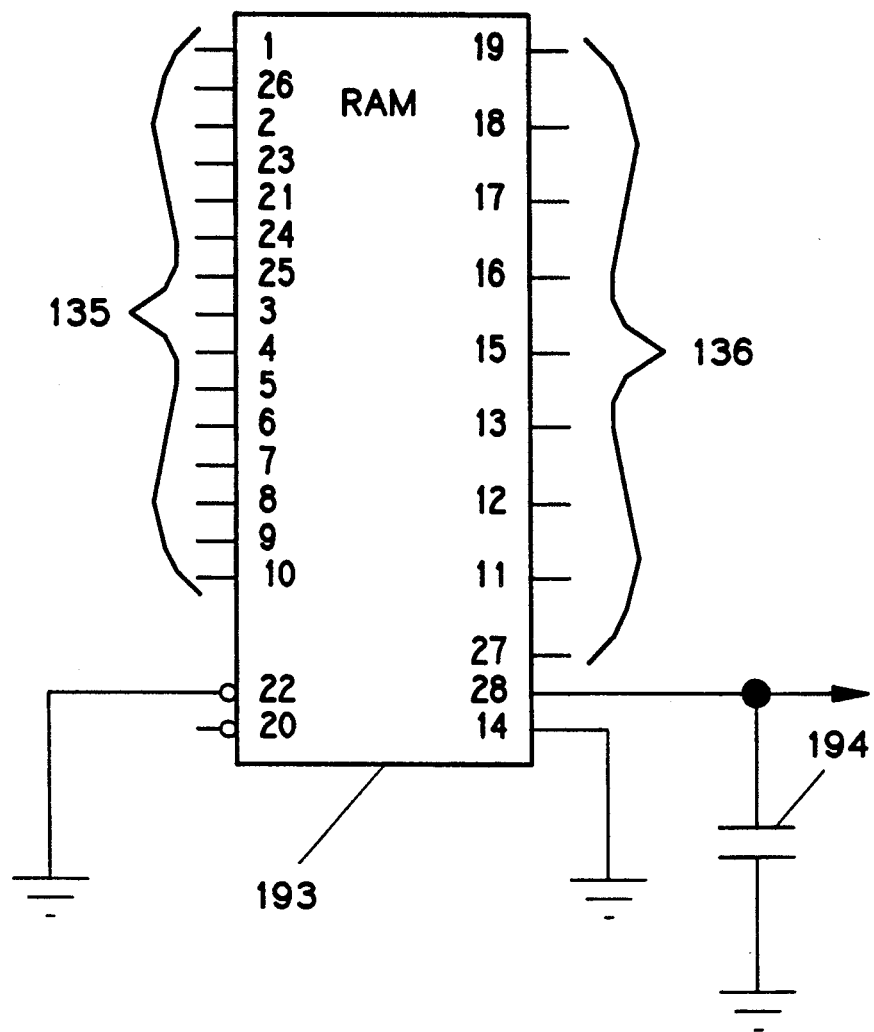
Figure 3F:
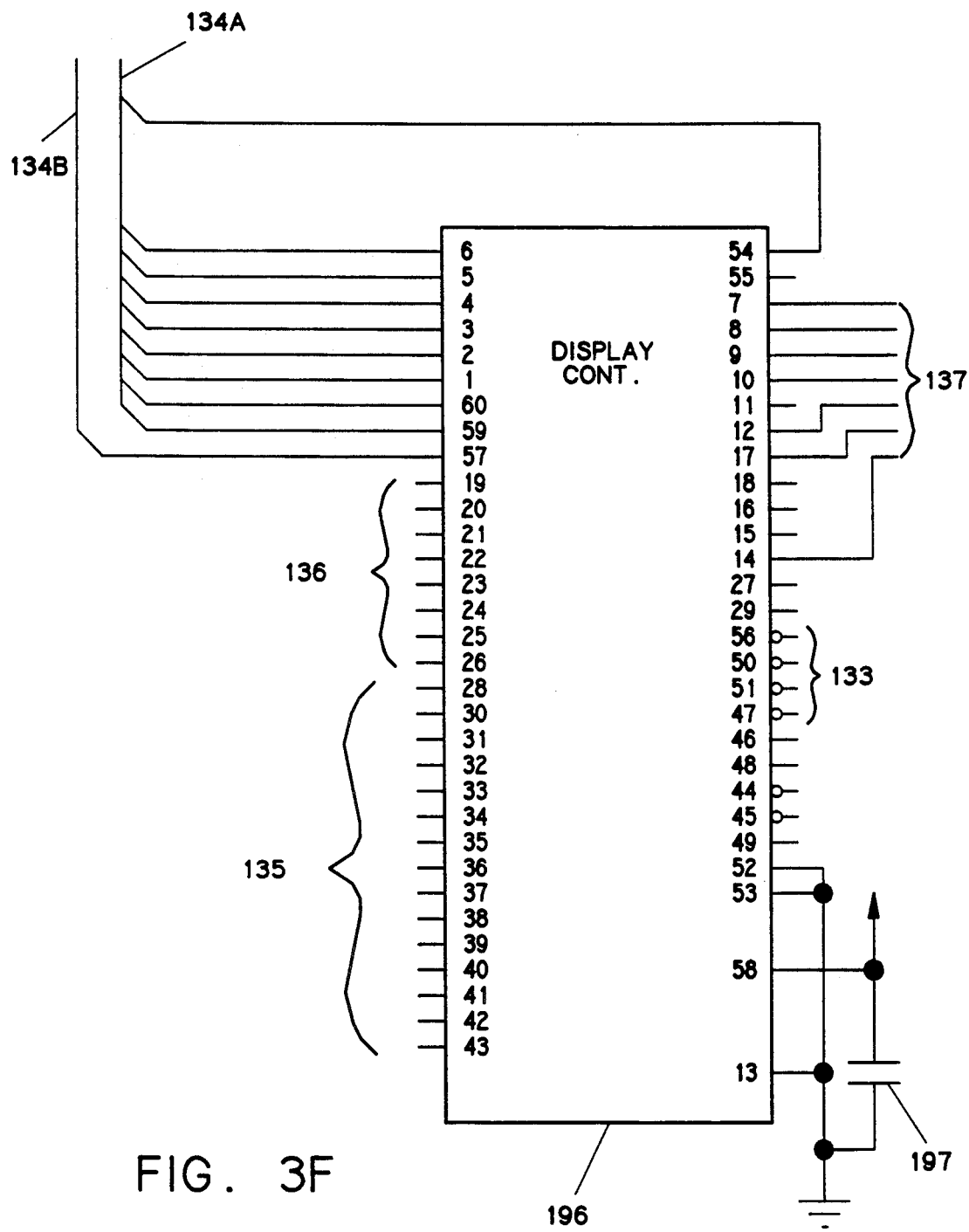

Turning now to FIGS. 3A through 3F the components and connections on the input/output printed circuit board are shown. The cables 130A, 130B, and 130C at the left of FIG. 3A connect to the cable 132 at the top left of FIG. 3B, which in turn connects into the top of FIG. 3C and goes on to FIG. 3D. Cables 134A and 134B connect FIG. 3D to FIG. 3F. Lines 133 in FIG. 3F connect to the lines 133 in FIG. 3C respectively from top to bottom, and similarly lines 137 in the two FIGS. connect. Lines 135 and 136 in FIG. 3E connect respectively to the lines 135 and 136 in FIG. 3F. The components in FIG. 3A include type 88C681 Dual UART (Universal Asynchronous Receiver and Transmitter) 140, type LT1039 level converter 141, 3.6864 MHZ oscillator 142, 15 picofarad capacitor 143, 5 picofarad capacitor 144, 0.1 microfarad capacitor 145, 10 Kohm resistors 146 and 148, 220 ohm resistor 147, and connectors 150 and 151. Connector 151 connects to an inventory management circuit board which will not be discussed in detail herein, while connector 150 connects to a standard RS-232 9-pin connector. The level converter 141 provides the signal levels necessary for the RS-232 port. The resistors, such as 149, are resistors that are internal to the LT1039 and are described in the instructions for that chip. The components shown in FIG. 3B include 10 microfarad capacitors 152, 153, and 154, connector terminals 155, 156, and 157, 0.1 microfarad capacitor 158, and type 8255A parallel interface adapter 159. Terminal 155 connects to the controller power supply, terminal 156 connects to the LCD backlight, and the −12 V, +12 V and +5 V outputs provide the board power. Connector 157 connects to the printer controller. FIG. 3C includes the following components: type 8255A parallel interface adapter 160, D.C. to D.C. converter 161, connectors 162, 163, 164, and 165, 10 Kohm resistors 166, and 167, 0.1 microfarad capacitor 168, 10 kohm variable resistor 169, 10 microfarad capacitor 170, 13 Kohm resistor 171, 97.6K ohm resistor 172, 100 microfarad capacitor 173, 330 Henry inductance 176, type 1N4001 diode 174, and 0.1 microfarad capacitor 175. Connector 163 connects to the relay/solid state input board (FIG. 4E), and connectors 164 and 165 connect to the RA probe interface. The D.C. to D.C. converter 161 provides a 21 volt bias power for the display 18. FIG. 3D includes type 8279 keyboard controller 180, type 74LST138 three to eight line decoders 181 and 182, connectors 64, 183, 184, and 185, 0.1 microfarad capacitors 187, 189, and 191, and 10 kohm resistors 188 and 190. Connectors 183, 184, and 185 connect to the keyboard, paper feed switch and keyboard respectively. FIG. 3E shows a type 84256 RAM 193, and 0.1 microfarad capacitor 194, while FIG. 3F shows a type E1330 display controller 196, and 0.1 microfarad capacitor 197.

Figure 4A:
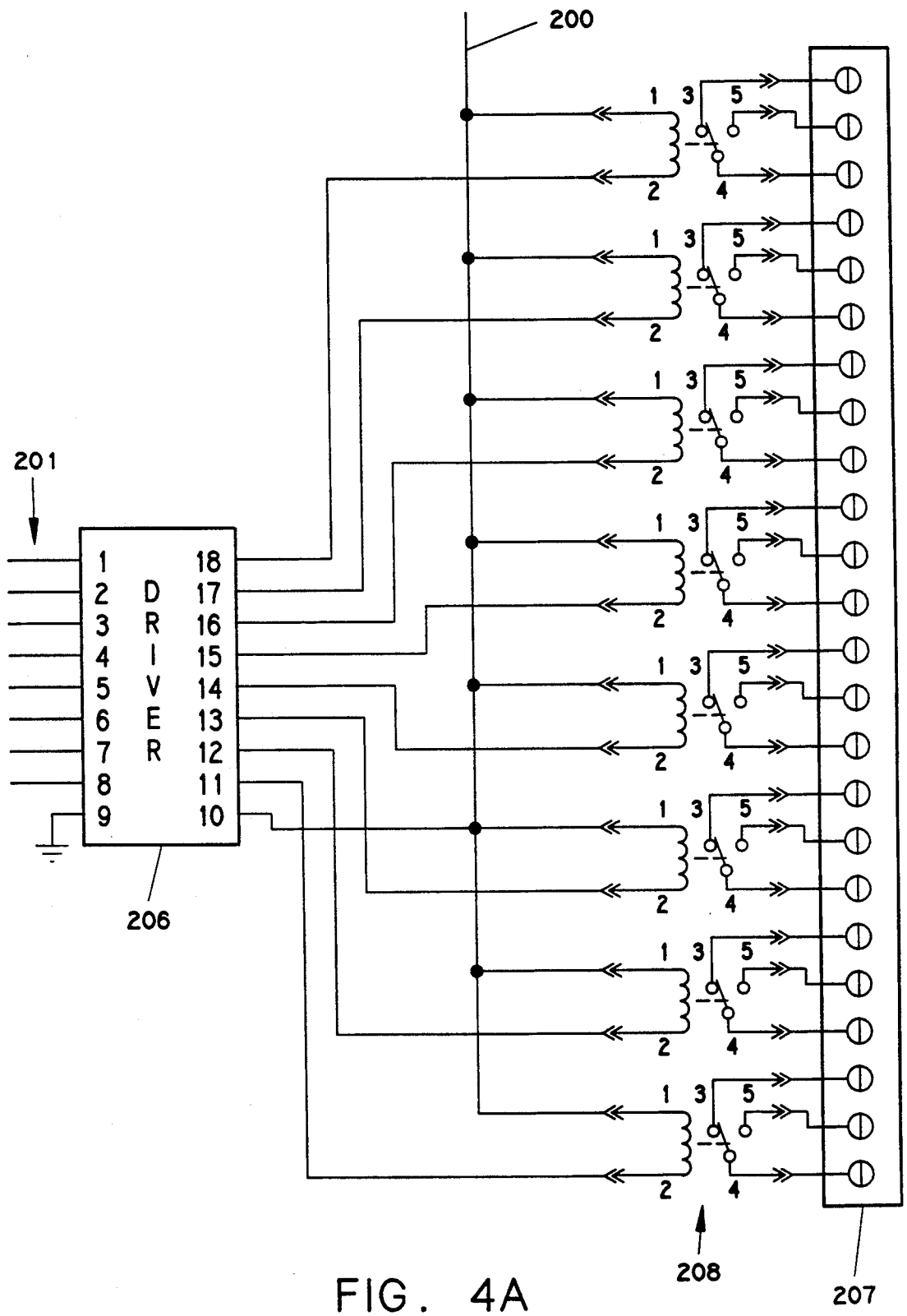
FIGS. 4A through 4E show an electrical circuit diagram of the relay/solid state input circuit board according to the preferred embodiment of the invention.
Figure 4B:
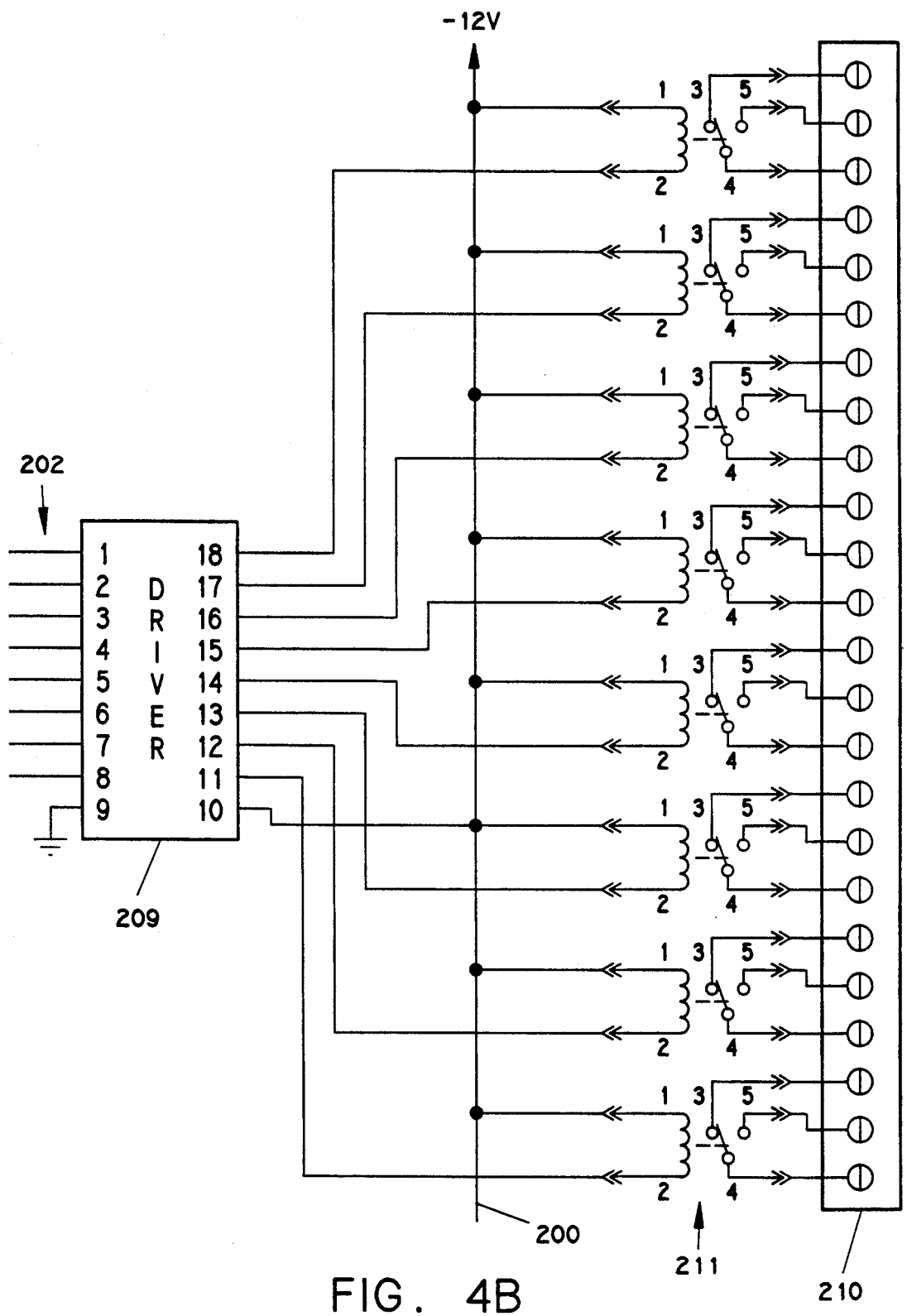
Figure 4C:
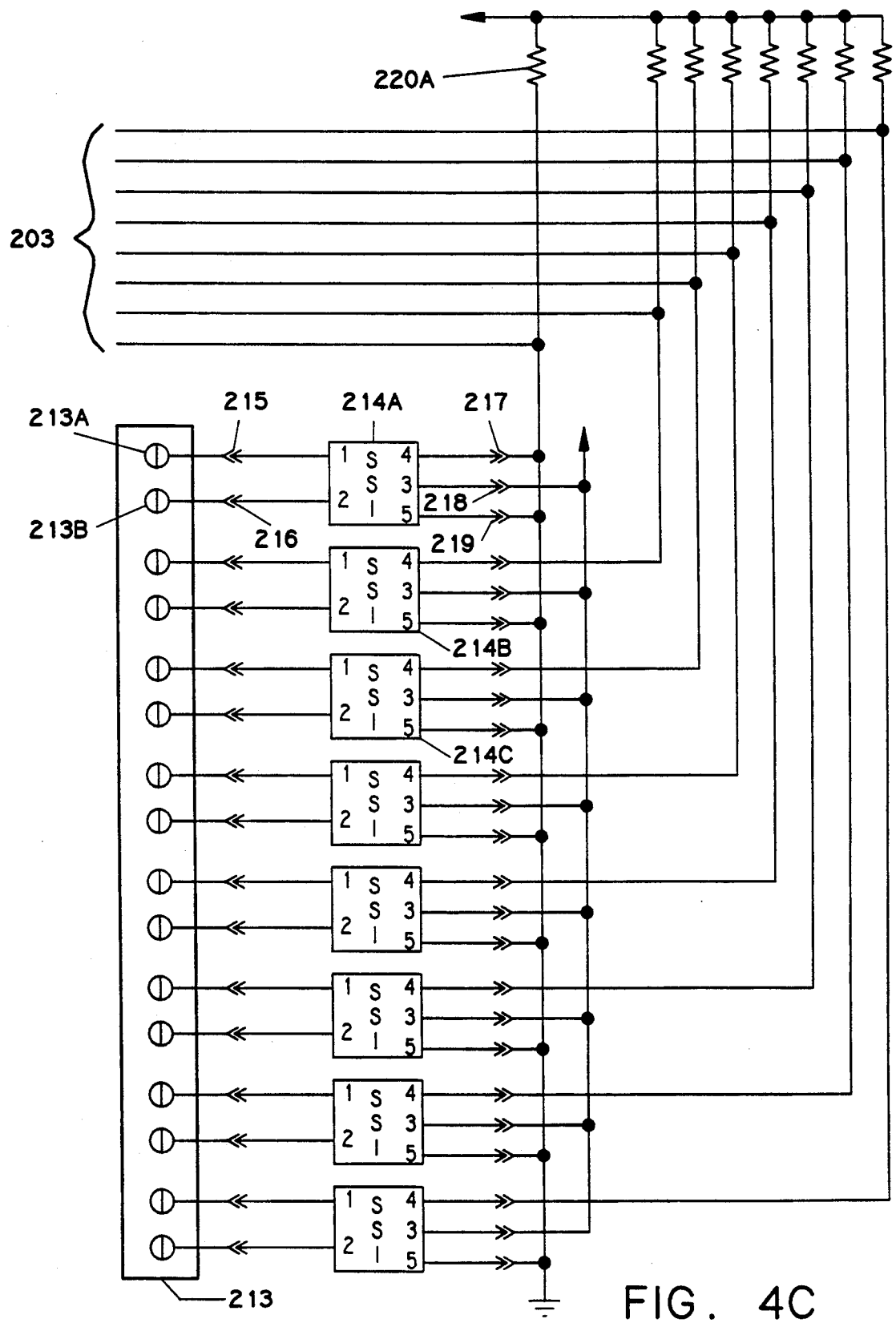
Figure 4D:
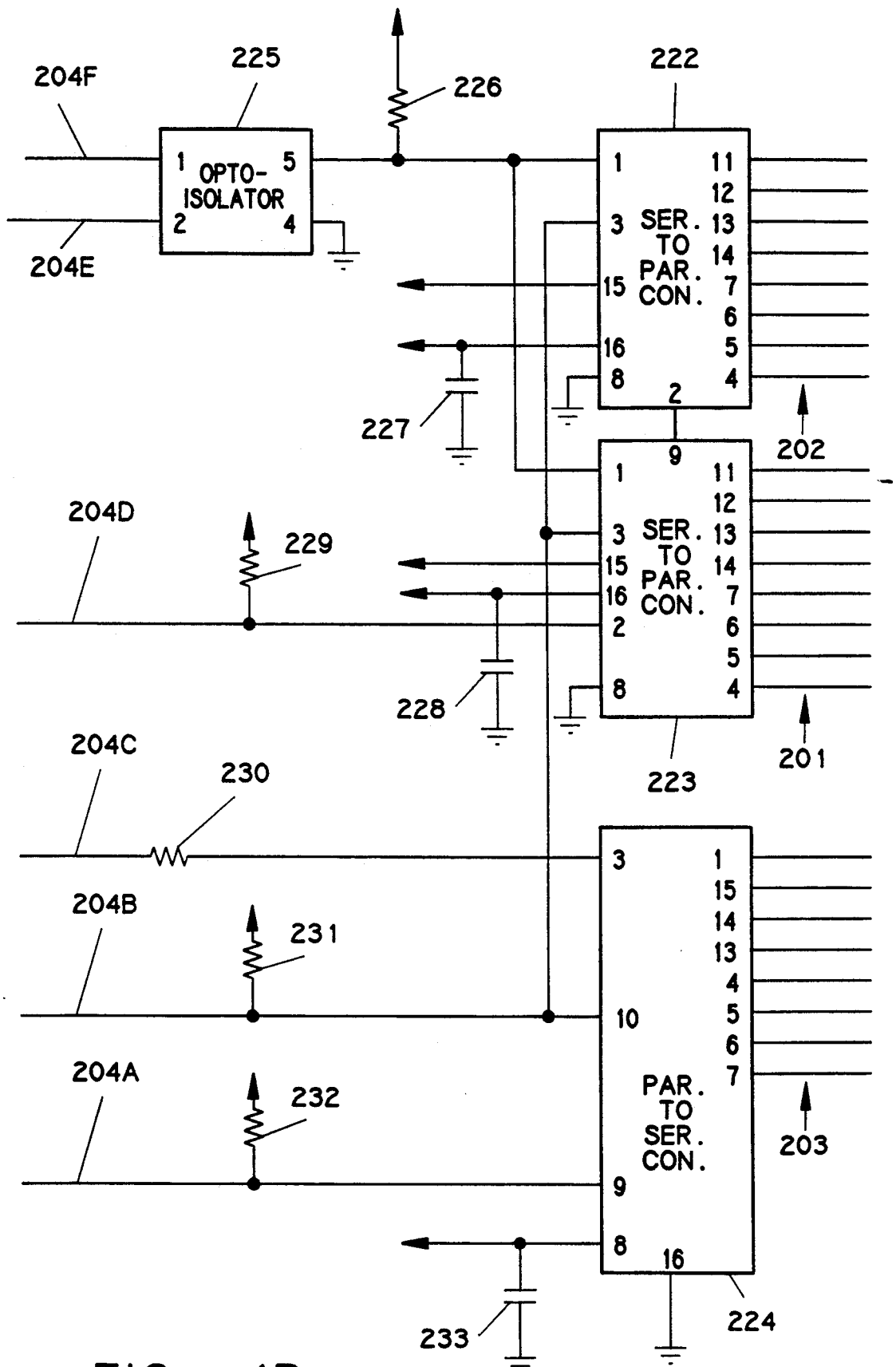
Figure 4E:
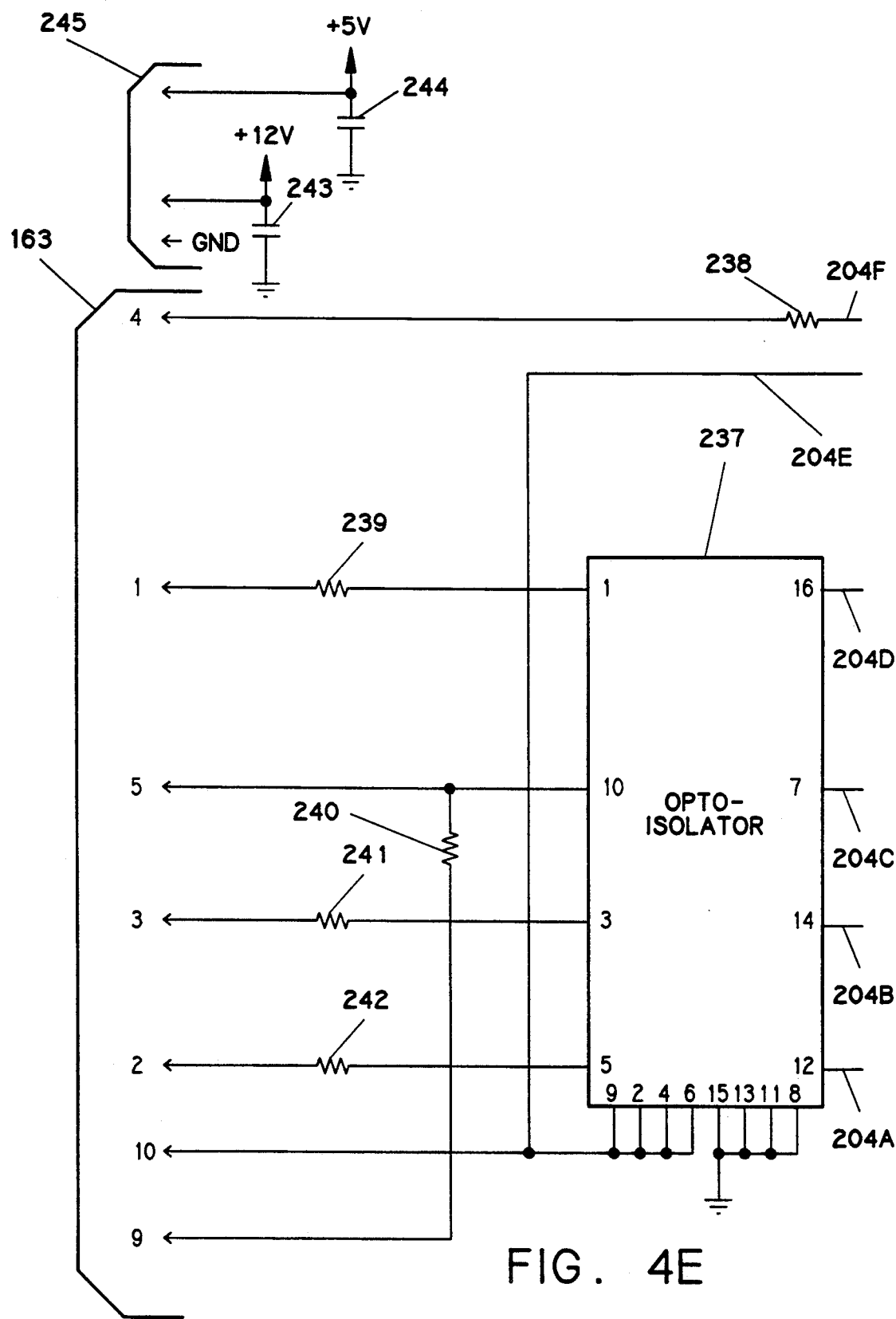

Turning to FIGS. 4A through 4E the components of the relay/solid state input board are shown. FIG. 4a connects to FIG. 4B via line 200 and to FIG. 4D via lines 201. FIG. 4B connects to FIG. 4D via lines 202; FIG. 4C connects to FIG. 4D via lines 203. If FIG. 4D is placed to the right of FIG. 4E, the connections of the two FIGS. via lines 204A through 204F is clear. Considering FIGS. 4A and 4B together, they each show a type ULN2803A driver 206 and 209 respectively, a field wiring connector 207 and 210 respectively, and a series of eight relays 208 and 211 respectively. The drivers 206 and 209 driver the current for the relay coils. FIG. 4C shows a field wiring connector for the solid state input connections and a series of eight solid state input modules, such as 214A and 214B. For each of the modules, such as 214A, the board has five sockets 215, 216, 217, 218, and 219, into which the pins of the module are pushed. The FIG. also includes eight 10 kohm resistors, such as 220A. The solid state input modules, such as 214A, are field installable. Either an A.C. or a D.C. module may be inserted in each location, depending on whether an A.C. or D.C. device is to be connected to the input on connector 213. If a D.C. device is to be installed, then the preferred module is a Grayhill 70M-IDC5 module, such as 214A, if an A.C. device having the commonly available 110 volts power is to be installed, then the preferred module is a Grayhill 70M-IAC5 module, such as 214B, and if an A.C. device having the commonly available 220 volts power is to be installed, then the preferred module is a Grayhill 70M-IAC5-A, such as 214C. Turning to FIG. 4D, chips 222 and 223 are each type CD4094BC and together form a serial to 16 lines of parallel converter. FIG. 4D also incudes a type CD4021BC parallel to serial converter 224, a single opto-isolator 225, 4.7 Kohm resistor 226, 0.1 microfarad capacitors 227, 228, and 233, and 1 Kohm resistors 229 through 232. Converter 224 converts the parallel inputs to a serial mode for the microprocessor, while converter 222, 223 converts the serial microprocessor data to parallel to drive the relays. The electrical components shown in FIG. 4E include a type PS2502-04 quad opto-isolator 237, 1 Kohm resistors 238 through 242, 10 microfarad capacitors 243 and 244, and connectors 163 and 245. The opto-isolator prevents noise from the relays from getting back to the logic on the input/output board. Connector 245 connects to the controller power supply and provides the +5 and +12 power sources for the board.

The connections of the various components should be clear from the drawings and the instructions that come with each component when they are purchased. To specifically identify the connections the signals on each line, where not obvious from the drawing, are as follows. On the interrupt controller 57 the number 21, 30, 31, 32, 27, 3, 2, 12-19, 26, 25, 24, 23, 22, 33-39, 1, 28, and 4-11 pins are connected to the CS, RD, WR, CLK, RST, STI, INT, D7, D6, D5, D4, D3, D2, D1, D0, A4, A8, A2, A1, A0, IR1, IR3, IR7, IR7, IR9, IR11, IR13, IR15, COUT, Q7-Q0 signals respectively. The 2-9 outputs of the resistor block 52 are connected to the INT8-INT1 signals respectively. The No. 16, 14, 12, 10, 8, 6, 4, 2, 24, 25, 7, 5, 8, 1, 9, 11, 13, 15, 20, 18, 21, 23, 22, 17, and 19 pins of connector 64 are connected to the D8, D4, D5, D7, D2, D1, D0, INT1, CLK0, A20, A0, A1, A2, A8, A10, A9, CLK, CS6, INT3, RST-, INT2, RST, WR1, AND RD1 signals respectively. EPROM 70A has its No. 27, 26, 2, 23, 21, 24, 25, 3-10, 22, 20, 00-07 pins are connected to the A14-A0, RD, CS01, D0-D7 signals respectively. Each of the other EPROMs and RAMs in FIGS. 2C and 2D, such as 73A, are connected identically except that the No. 1 and the No. 27 pins of each RAM are connected to the A14 signal and the WR signal respectively, each of the No. 20 pins of EPROMS 70B through 70F and the RAMs 73A and 73B are connected to the CS01 through CS07 signals respectively. The 1-3, 9, and 7 pins of decoder 81 are connected to the A0-A2, CS6 and CS7 signals respectively The 1-3 pins of decoder 80 are connected to the A15-A17 signals and it 15-7 pins are connected to the CS00-CS07 signals respectively The 23-1 and 47 pins of CPU 24 are connected to the AD0-AD15 and A16-A23 signals respectively, while the 42 and 46 pins are connected to the ST1 and INT signals respectively. Pins 8 and 10 of hex inverter 93 are connected to the RST- and RST signals respectively. Lines 95A-95D (FIG. 2F) are connected to the WR1, WR, RD1, and RD signals respectively. The No. 7 pin of watch dog timer 121 is connected the KEEP ALIVE signal which also connects to the No. 8 pin of interrupt controller 57. The No. 14 pin of math co-processor 120 is connected to the CLK signal, its No. 15-20 pins are connected to the RST- and the AD15-AD11 signals, and its NO. 1-11 pins are connected to the AD10-AD0 signals. The No. 2-9 pins of latch 112 are connected to the AD15-AD8 signals, while its 12-19 pins are connected to the A8-A15 signals respectively. The No. 2-9 pins of latch 111 are connected to the AD0-AD7 signals, while its 12-19 pins are connected to the A7-A0 signals. The 2-9 pins of bus 110 are connected to the AD0-AD7 signals, while its 11-18 pins are connected to the D7-D0 signals. Turning to FIGS. 3A through 3F, the 1-4, 19, 10, 18, 11, 17, 12, 16, 13, 25, 15, 5, 6, and 26 pins of UART 140n are connected to the A0-A3, D0-D7, RST, INT2, WR1, RD1, and CS62 signals respectively. The 9, 8, 34-27, 35, 36, 5, and 6 pins of PIA 159 are connected to the A0, A1, D0-D7, WR1, RD1, and CS63 signals respectively, while its No. 14 pin is connected to the INT3 signal. The 38-40 pins of PIA 160 are connected to the OIL, WET, and DRY signals on RA interface connector 165, its 2, 3, and 4 pins are connected to the OIL, WET, and DRY signals respectively on RA interface connector 164, its 25-22 pins are connected to the RA3-RA0 signals on connector 165, its 21-18 pins are connected to the RA3-RA0 signals on connector 164, and its 10, 11, 12, 13, and 17 pins are connected to the DATA 0, LATCH I, CLK, LATCH 0, AND DATA I signals respectively on connector 163. The pins on the left side of PIA 160 are connected to the same signals as the corresponding pins on PIA 159. The 10, 12-15 pins of decoder 181 are connected to the CS65, and CS63-CS60 signals respectively, while its 1, 2, 3, and 5, pins are connected to the A10, A19, A20, and CS6 signals respectively. the 21, 12-19, 4, 3, 9, 11, 10, and 22 pins of keyboard controller 180 are connected to the A0, D0-D7, INT1, CLK0, WR1, RD1, And CS61 signals respectively. The No. 54 pin of display controller 196 is connected to the CLK signal, its 57, 59, 60, and 1-6 pins are connected to the A0, and D0-D7 signals respectively, while its 47, 51, 50, and 56 pins are connected to the RST-, WR1, RD1, and CS60 signals. On the relay/SSI board in FIG. 4E, the No. 1, 10, 3, and 5, pins of opto-isolator 237 are connected to the DATA 0, DATA I, CLK, and LATCH I signals respectively of connector 163, while the resistor 238 is connected to the LATCH 0 signal on the connector. As is conventional nomenclature in such electrical schematics, all pins connected to the same signal are connected to each other. All connections other than those given above in terms of the signals should be clear from the drawings.

Turning now to FIG. 5, the truth table for the keyboard system 11 is shown. The keyboard system 11 operates by the keyboard controller driving each one of the C1 through C9 lines along the top to a logic zero and examining the lines B1 through B9 along the left side to see the result. This tells the controller which key has been pressed. It should be noted that the function key switches 20 are integrated into the truth table with the other keys on keyboard 15. Each time a key is pressed, the system emits a short audible beep to indicate that the pressing of the key has been recognized.

Figure 6:
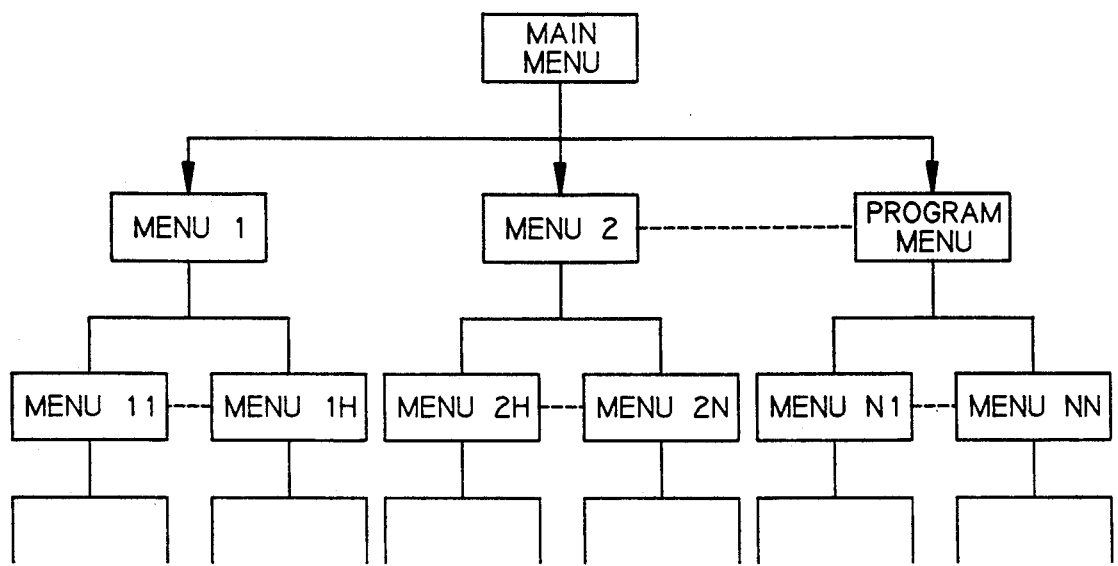
FIG. 6 shows a schematic diagram of the nested menu structure of the preferred embodiment of the invention.
Figure 7:
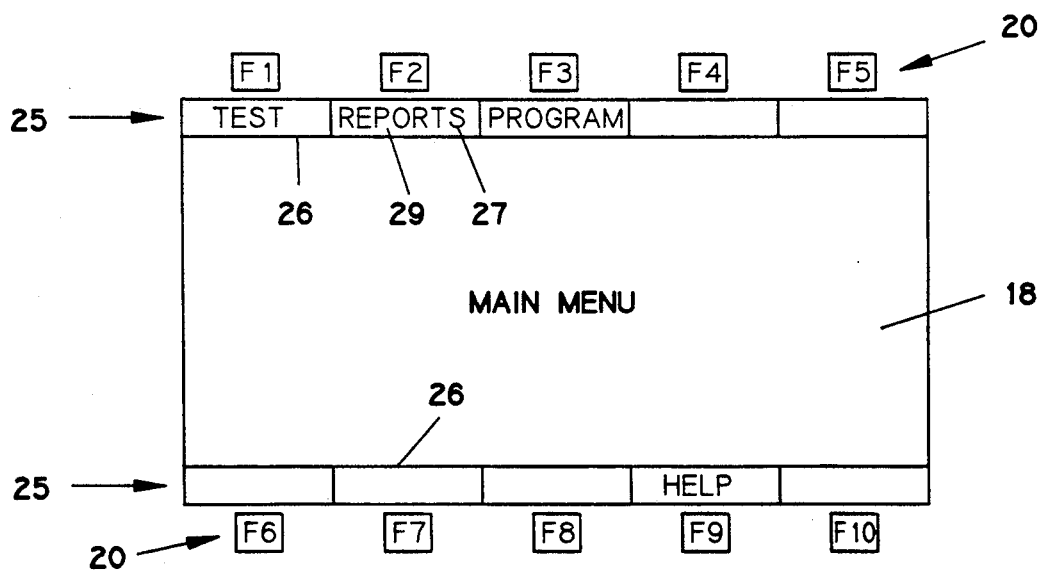
FIG. 7 shows the main menu display showing the function keys defined in the main menu mode.

Referring to FIG. 6, the system in general operates in a nested set of modes in each of which a different one of a nested set of menus is displayed. The operator moves form one mode to another, and from one menu to the other by depressing keys as directed by the menus. In the preferred embodiment, an initialization display comes up for ten seconds when the system is turned on, then the system moves to a display which directs the operator to turn the top or first switch of dip switch 50 (FIG. 2A) off so that the system can be programmed. The system then enters the main menu as shown in FIG. 7. If the F3 function key is pushed the system enters the programming mode.

Figure 8A:
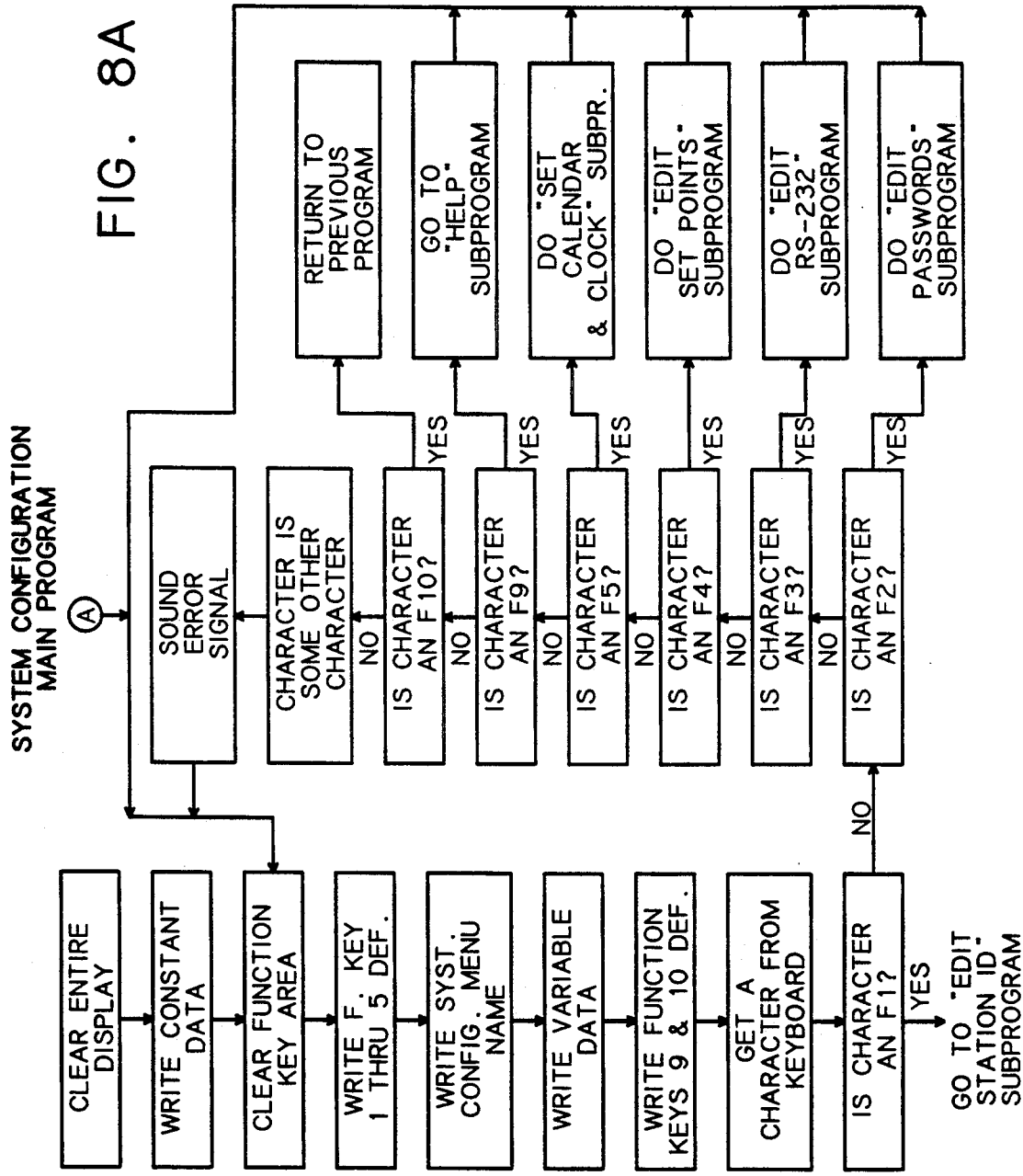
FIGS. 8A through 8C show the preferred embodiment of a flow chart for a typical program in which the function key labels and functions are changed several times, i.e. the system configuration program.
Figure 8B:
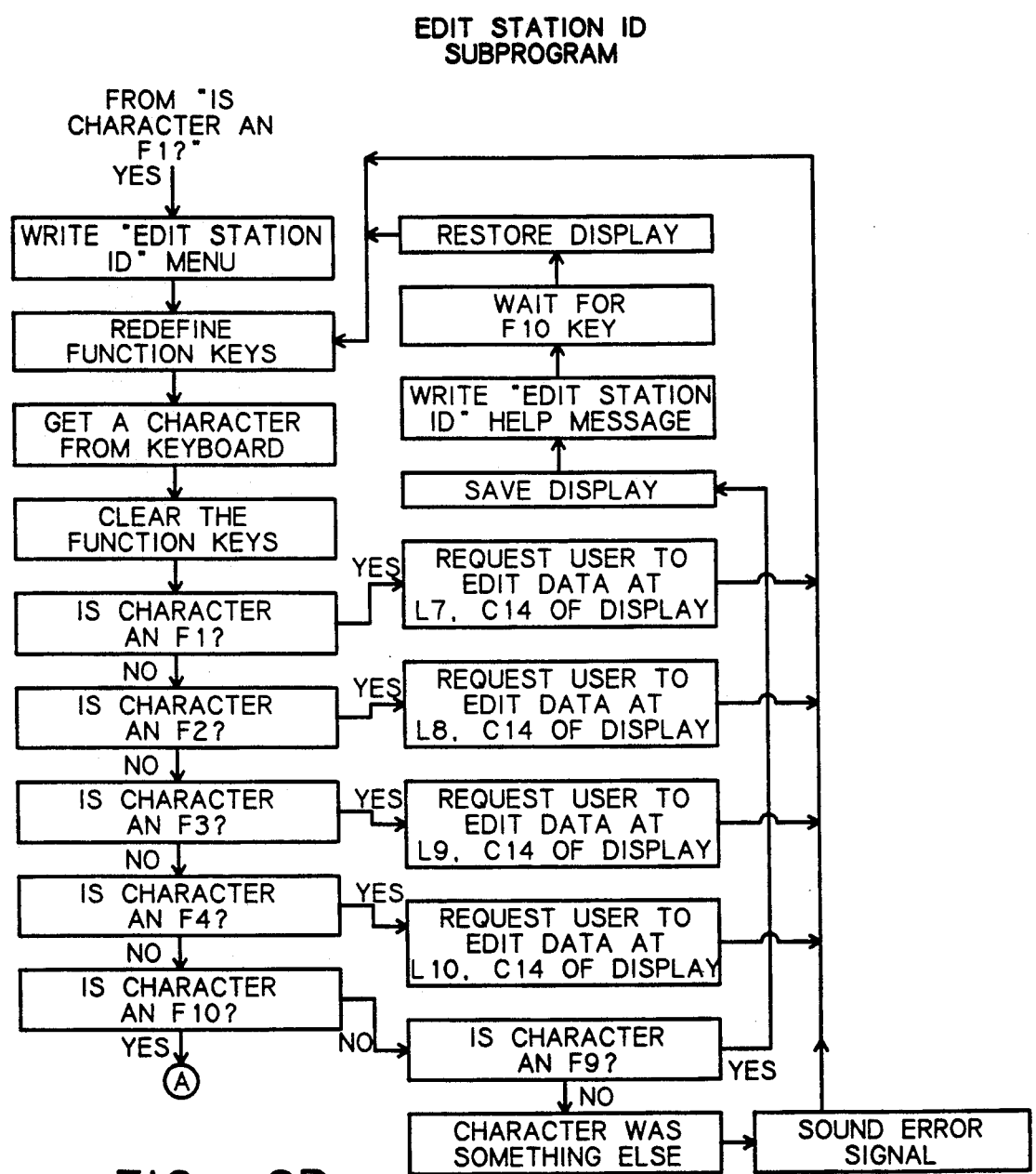
Figure 8C:
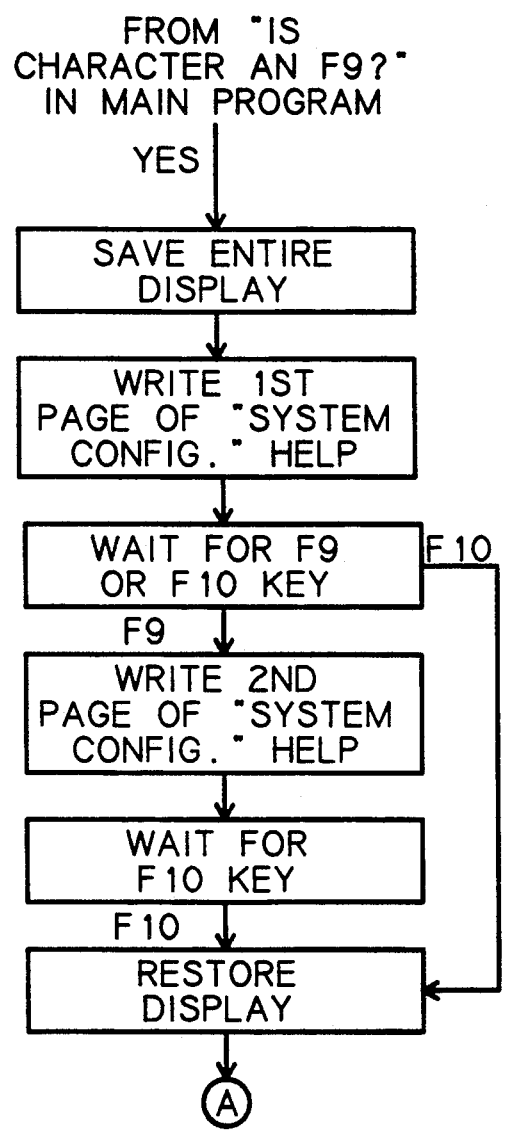

A flow chart of an exemplary program within the operating mode is shown in FIGS. 8A through 8C. When this "System Configuration" program is entered, the software clears the entire display and the constant data, including the lines 26 (FIG. 7) is written to the display. The function key area is then cleared (which is redundant at this point but will not be later) and the text which gives the definition of the function keys 1 through 5 for this menu is written. The menu name, "System Configuration Menu", is written to the display, the variable data is written, and then the text for the definition of function keys 9 and 10 is written. In this menu no text is written in the function key areas for keys F6, F7, and F8. The programming then directs the system to get a character from the keyboard. If the character indicates that F1 has been pressed, then the system goes to the "Edit Station ID" subprogram (FIG. 8B). If the character is an F2, the system goes to the "Edit Passwords" subprogram. Likewise if the character is an F3, F4, or F5, the system enters the "Edit RS-232" subprogram, the "Edit Setpoints" subprogram, of the "Set Calendar and Clock" subprogram respectively. If the character is an F9 the "Help" subprogram for the System Configuration Program is entered (FIG. 8C). If the character is an F10, which in this program is the "Go Back" key, the program returns to the previous program from which the System Configuration Program was entered. If the character is some other character than F1 through F5, F9, and F10, then a key that is inappropriate for this operation mode has been pushed, and the system sends an error signal, which in this embodiment is a long audible beep in addition to the short beep. The system then returns to the "Clear Function Key Area" step, and recycles through the loop until a correct key is pushed an the system enters one of the indicated subprograms. As will be seen below, the system will come back to this screen on the return from the subprogram, and will continue to cycle until the F10 key is pushed and then return to the previous program Turning to FIG. 8B, The Edit Station ID subprogram is shown as example of a subprogram. First the new menu name, i.e. "Edit Station ID" is written to the display, then the function keys are redefined. A character is then gotten from the keyboard, and the function keys are cleared. If the character is an F1, F2, F3, or F4, the user is requested to edit the data at column 14, line 7, 8, 9, or 10 respectively of the display. In each of these instances the system will return to the "Redefine Function Key" step after the data has been edited. If the character is an F9, the current display is saved, then the help message for the Edit Station ID subprogram will be displayed. In the Help mode the system waits for the F10 or "Go Back" key to be pressed, then restores the display, and returns to the "Redefine Function Keys" step. If the character is something other than the F1 through F4, F9 or F10 keys, then the long error beep is produced and the system reloops as before. It continues looping until the F10 key is pushed, then exits the Edit Station ID subprogram and re-enters the System Configuration Program at the point A.

An exemplary Help Subprogram is shown in FIG. 8C. This is the subprogram that is entered when F9 is pushed in the System Configuration Program. First the entire display is saved, then the first "Help" screen is written to the display and the system waits for either the F9 or F10 key to be pushed. During this time, the screen appears as in FIG. 9. As can be seen, text is written in only the F9 and F10 key areas. If F9 is pushed, the second help screen for the program is displayed, and the system waits for the F10 key. When the F10 key is pushed, the system restores the display, and returns to the System Configuration Program (FIG. 8A) at point A.

Figure 10:
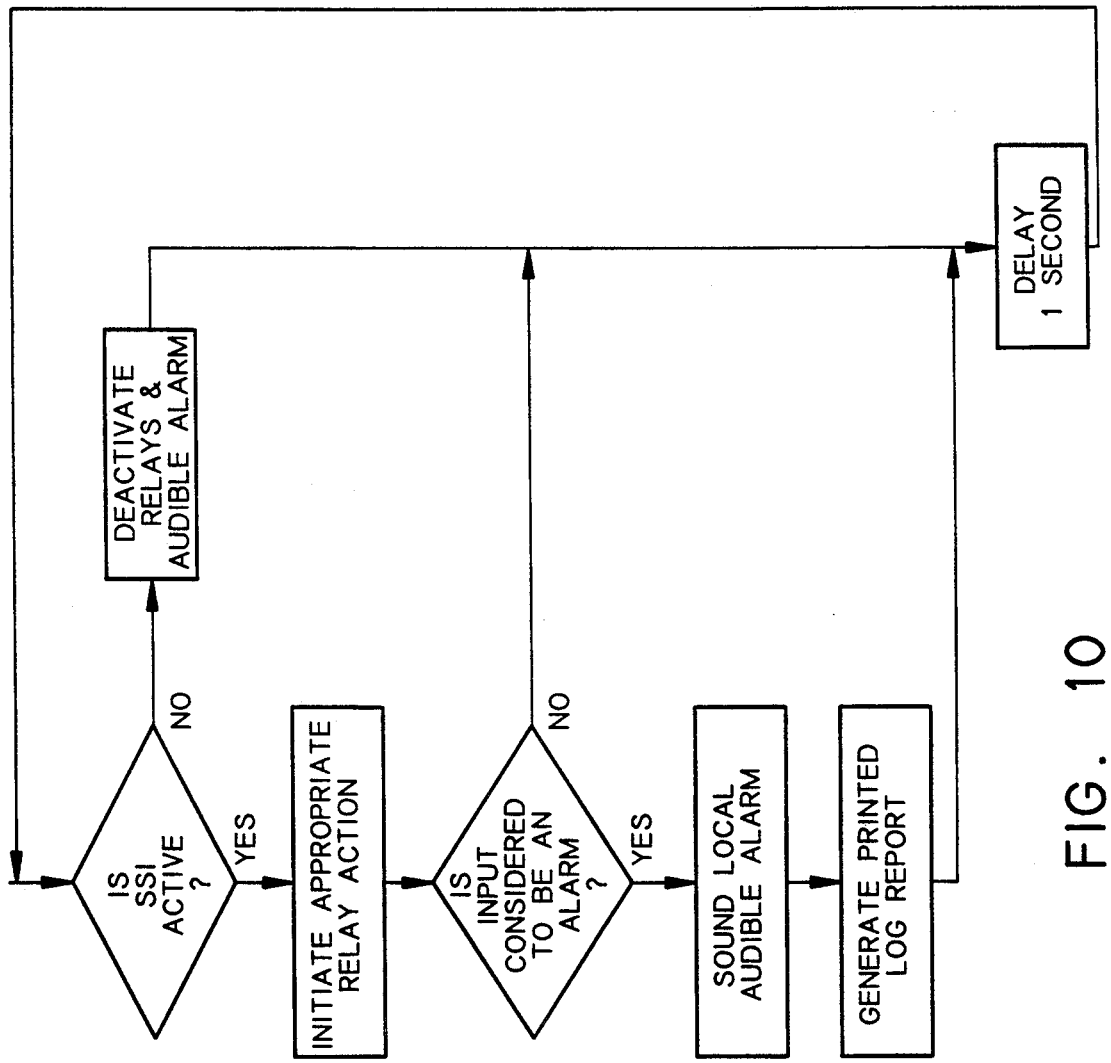
FIG. 10 shows a flow chart of the preferred embodiment of the software for responding to a one-bit-digital input from a solid state input module.

Turning to FIG. 10, a flow chart of the software for responding to a one-bit-digital signal from a solid state input module, such as 214A, is shown. At the time of installation of the system, the appropriate modules, 214A, 214B, etc. are selected depending on what electrical devices are desired to be monitored, whether a particular device to be connected to connector 213 is A.C. or D.C., and the voltage or the device. During the configuration and programming of the system the operator selects alarm, latching, or other indicator conditions such as described in U.S. Pat. No. 4,740,777 which is hereby incorporated by reference. The operator further selects whether or not each particular one-bit signal is to be considered to be an alarm, and stores this indicator condition in memory 70. When the system is set up and operating in a monitoring routine, the CPU checks each solid state input module to see if it is active. If it is, appropriate relay action, as indicated by the stored conditions, is initiated. This may involve turning on a pump or causing a wide variety of other machines to be operated. The system then asks whether the particular one-bit signal is considered to be an alarm. If is not, then the system waits for one second then re-enters the loop and checks the solid state module again. If the input is considered to be an alarm, then the local alarm is sounded, a log report is generated, and the system then reloops after an one second delay. During the delay period, the control of the system is passed to a taskmaster program, which is a program which manages the many functions of the system. The system returns to this subprogram only if there is an active SSI module.

The input modules, such as 214A, are capable of responding to any of a wide range of voltages, preferably between about 3 and 32 volts D.C., 90 to 140 volts A.C., or 180 to 280 volts A.C. This permits almost any common machine to be monitored by the invention. For example a gasoline pump may be attached to the input, and when the pump operates, the system may take appropriate action. For example, if fluid is detected external of the pump whenever it operates, a message may be sent that the pump is malfunctioning. It should now be clear that the invention permits a wide variety of sophisticated responses to be made by the invention that were not previously possible with prior art fluid detectors. People experienced with the operation of complicated fluid storage and transfer devices will see that the system may be used to anticipate a wide variety of occurrences and prevent small problems from becoming large.

Figures 11, 12:
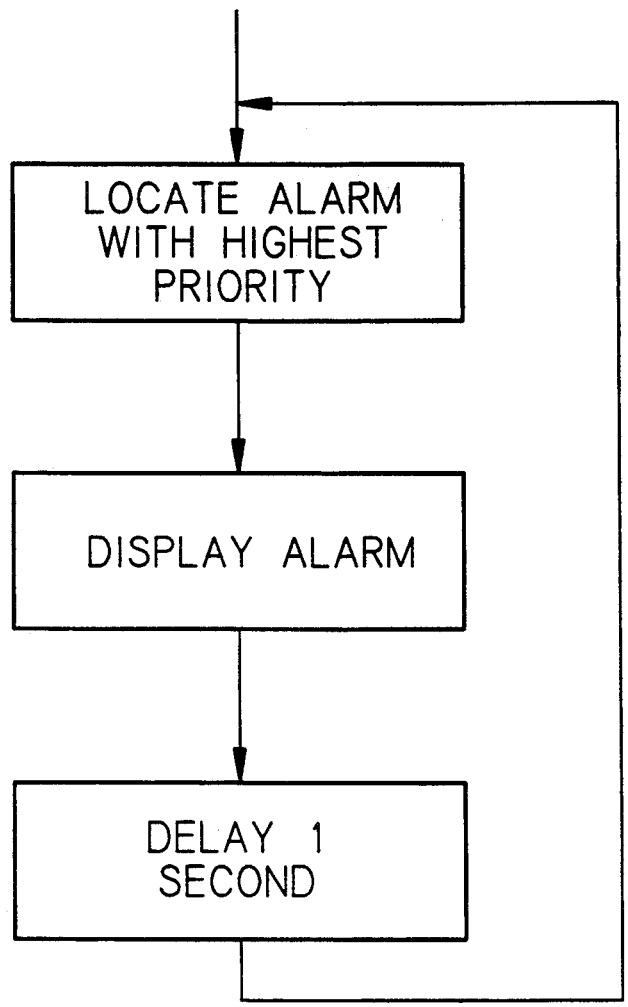
FIG. 11 is a flow chart showing the preferred embodiment of the software program used in displaying the alarms.
FIG. 12 shows the preferred embodiment of the priority table used in the software program of FIG. 11.
Figure 13:
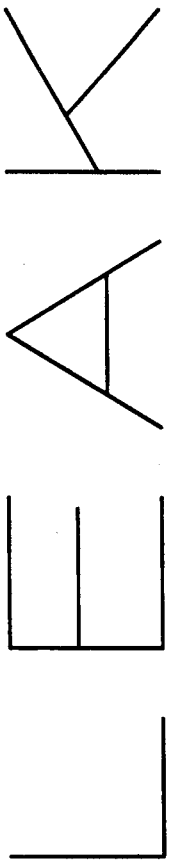
FIG. 13 shows the preferred embodiment of the display screen and function keys for displaying and acknowledging an alarm.

Turning to FIG. 11, the prioritization and display of alarms will be described. The system is configured and programmed with alarm conditions as described in U.S. Pat. No. 4,740,777 and the improvements discussed herein, and then is placed in an operating mode in which it monitors the probes 14 and devices which may be attached to connector 213. When one or more signals are received by the controller corresponds to one or more of the alarm conditions, one or more alarm flags are set by the system software as is described in the above-referenced patent. The system then goes into an additional subprogram as shown in FIG. 11. The system compares the alarms against the alarm priority table shown in FIG. 12 and then displays the alarm of highest priority. A typical display is shown in FIG. 13. The "LEAK" message flashes on and off during this display to attract attention. After the display is enabled, the system then delays for one second, and then re-enters the loop and reprioritizes alarms that are then active. As indicated by the display of FIG. 13, an alarm may be acknowledged by pressing function key F4. If an alarm is acknowledged, or if the event causing the alarm disappears, the alarm may be deactivated by disabling the alarm flag (see also the discussion below). Then when the alarms are prioritized, the next highest priority alarm will be displayed. As shown in FIG. 12, the alarms are preferably prioritized by alarm type and probe number. The order of alarm type is FAIL, OIL, WET, DRY, SSI (solid state input). The order of priority by probe number is probe zero (overfill probe), probe number 1, probe number 2, etc. The system is capable of handling 32 probes and 8 SSI devices. Thus the system will first display all probes that have failed in order, then all probes that are giving oil alarms in order, etc. If only one alarm flag has been set, that alarm is displayed until it is deactivated. Again, during the delay period, the control of the system is passed to the taskmaster program, and returns to this subprogram only if there is an active alarm.

Figure 14:
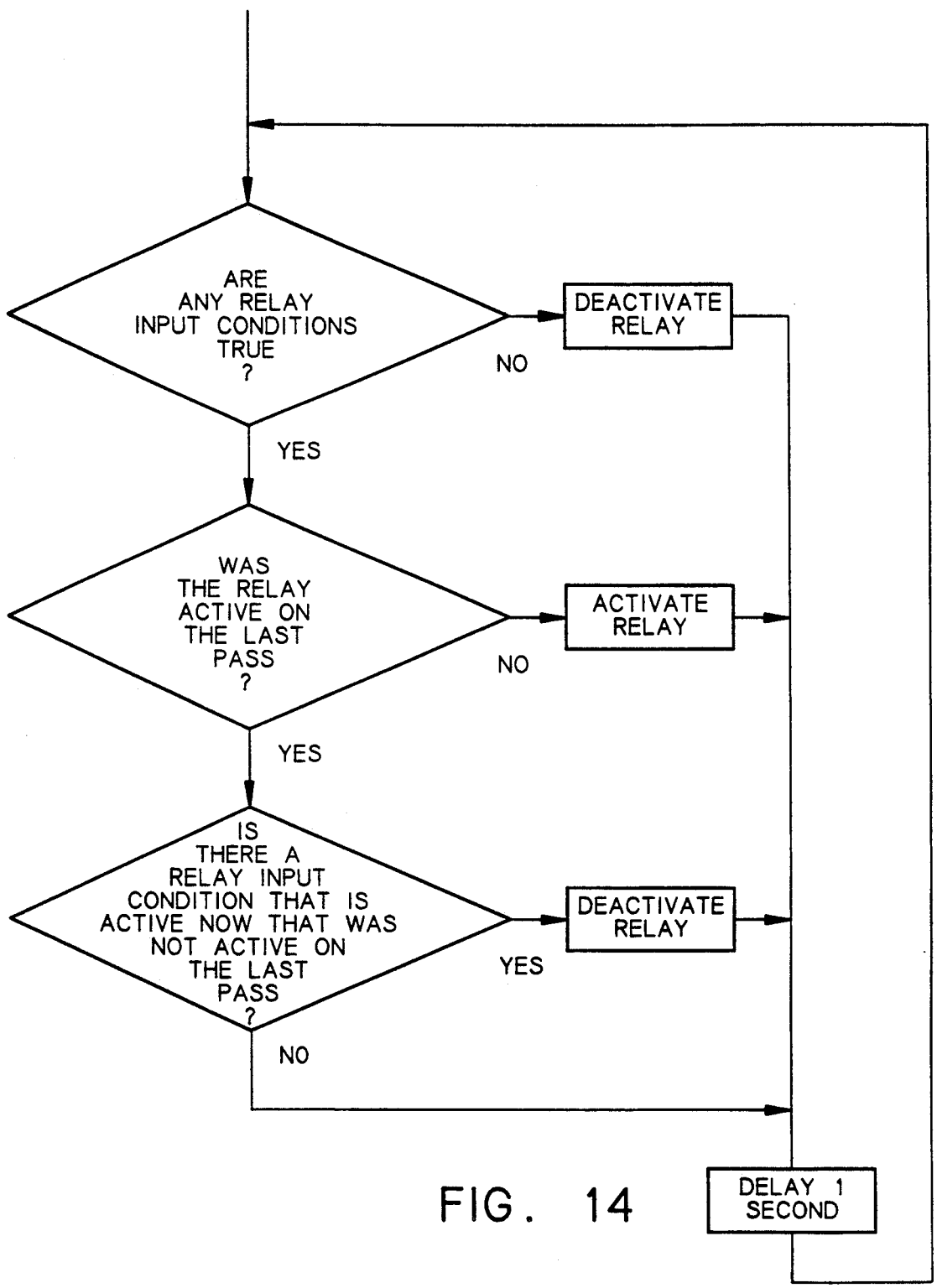
FIG. 14 shows a flow chart of the preferred software for operating the release and relatch function.

Turning now to FIGS. 14 and 15 the relay release and relatch function will be described. At the time that the system is configured the latching conditions are stored in memory 70 as described above. During the configuration of the relays, a screen as shown in FIG. 15 is displayed. At this time the release and relatch function may be enabled or disabled by pressing function key F3. In the display shown, the function is labeled "RE-FLASH" and is turned off. If the F3 key is pushed it will be turned on.

Once the system is programmed it is then placed in the mode in which it monitors the probes and devices attached to the solid state input connector 213 (FIG. 4C). During this monitoring mode the system will enter the program shown in FIG. 14. When the system enters this monitoring mode subprogram, it first looks to see if any relay input conditions are true. If there are, it then looks for the flag that tells it if the relay was active on the last pass. If not, it activates the relay and sets the relay active flag, delays for one second, then re-enters the loop. When it passes through the loop again the flag that indicates the relay is active will be set and the subprogram will pass to the "YES" branch of the "Was the relay active on the last pass" decision tree. If there is not a relay input condition (for that relay) that is now active that was not active on the last pass, then the system again delays for a second and re-enters the loop. If there is a relay input condition active that was not active on the last pass, then the relay is deactivated, and the system again delays for one second and re-enters the loop. the next time through, the system will pass to the "NO" branch of the "Was the relay active on the last pass" decision tree, and the relay will be reactivated. It will stay activated until another relay input condition becomes active, or the condition for which the system is programmed to deactivate occurs. The subprogram is repeated for each relay for which the release and relatch function is programmed. Here again, during the delay period, the control of the system is passed to the taskmaster program, and the system returns to this subprogram only if there is a relay input condition that is true.

The relay release and relatch function permits the system to report each occurrence of a input condition that would trigger the relay. For example, if the relay is attached to a automatic telephone dialer, the telephone message would be delivered each time a new input condition became active. This allows the system to report on many more input conditions with no increase in hardware and little change in software.

Turning now to the selectable relay release function of the system, the system is first configured as described in U.S. Pat. No. 4,740,777. At the time of programming the probes and relays, the release conditions under which each individual relay will release are selected as follows. FIG. 17 shows a preferred embodiment of the display for assigning relays to the probe being configured during the programming mode. The information on the configuration of the particular probe is given at the top part of the screen. The bottom half of the screen is the relay menu. Under the words "RELAYS ATTACHED" the number of relays available is given, which is eleven for the particular probe shown. Under the number of relays available, a row of numbers representing each available relay is given. At the left, the available alarm types are given, which for this probe are "FAIL" and "LEAK". Using the function keys F1 through F4 a flashing cursor may be moved up, down, left and right respectively on the screen. A relay is attached by moving a flashing cursor to the desired position corresponding to the relay number and the available alarm. Then using the toggle, i.e. key F5, increments the alarm state among the following possible states: blank for the relay unattached, D for the relay attached but the alarm disabled, and E for the relay attached and the alarm enabled. If the relay is attached, simultaneously and an A, B, or C will appear at the corresponding position under "RELEASE CONDITION". The cursor may then be moved to the positions under "RELEASE CONDITION" and the F5 key used to toggle between the A,B, or C release condition. As indicated at the bottom of the screen, A selects the release condition that the alarm must be acknowledged to be deactivated, B selects the condition that both the alarm must be acknowledged and event clear, and C the condition that the event must be cleared. When the release conditions have been set, the F10 key is pushed and the screen is returned to the probe configuration menu. After the system is configured and programmed as described above it may be placed in an operating mode in which it monitors the probes 14 and devices which may be attached to connector 213. When one or more signals are received by the controller corresponds to one or more alarm conditions, one or more alarm flags are set by the system software as is described in the above referenced patents, and an alarm is displayed as shown, for example, in FIG. 13. When the alarm is noticed by an operator, it may be acknowledged by entering a code, so that only authorized persons may acknowledge and alarm, then pressing the F4 key. This sets an alarm acknowledged flag for that alarm. Once the alarm is acknowledged, the F4 key is no longer defined on the alarm screen display.

Figure 16:
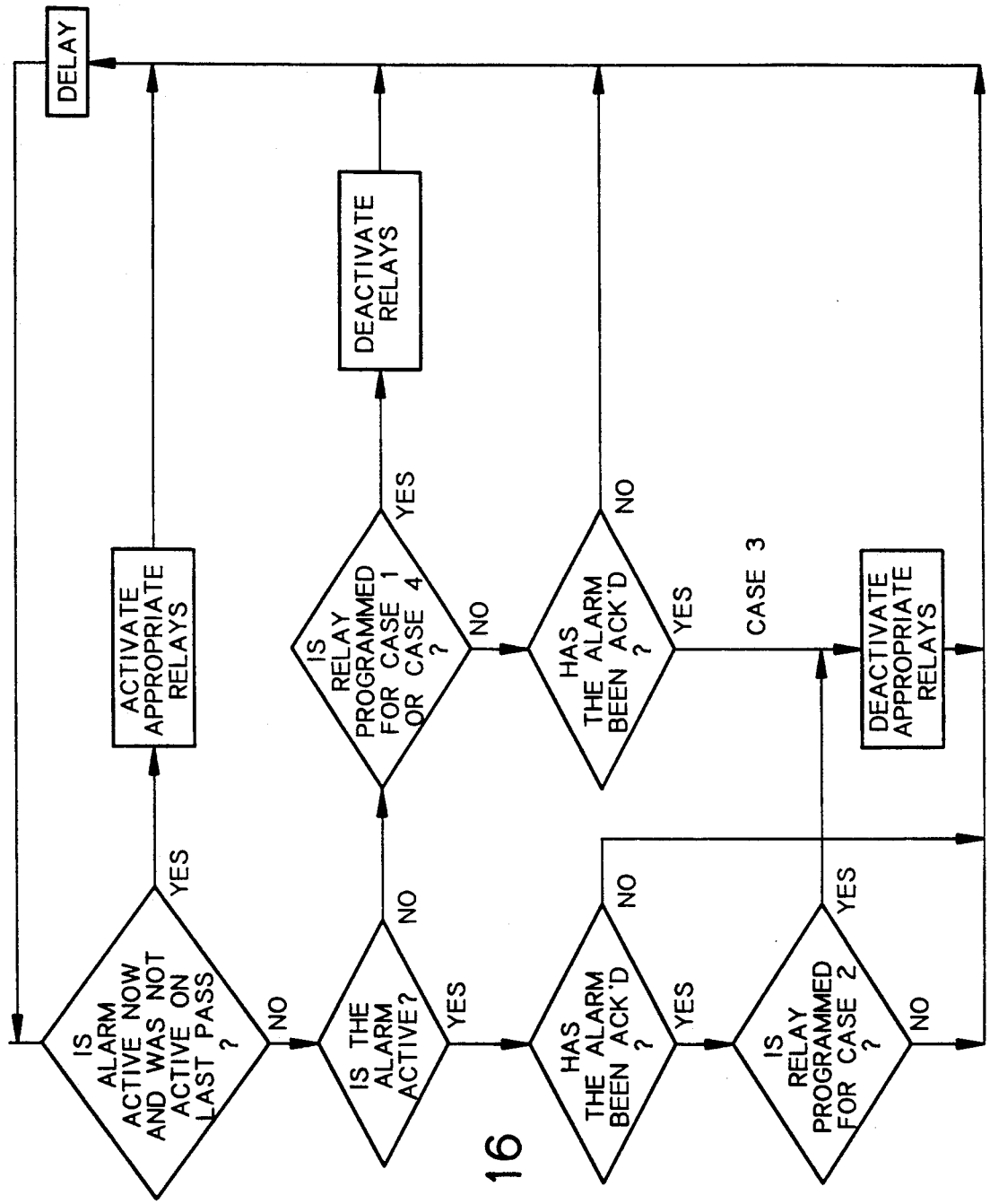
FIG. 16 shows a flow chart describing the preferred embodiment of a software program that automatically deactivates the relays upon occurrence of the conditions corresponding to the stored relay deactivation conditions.

During the monitoring program the system goes into subprogram to automatically releases the relays. The preferred embodiment of such a program is shown in FIG. 16. In this embodiment, the system has been programmed with four release conditions, one more than the three, A, B, and C, discussed in the above paragraph discussing the programming of the release conditions. We present these two different embodiments to provide a more thorough understanding of the different possibilities available. The extension of the above programming to this embodiment should be clear, as it simply requires a fourth iteration in the toggle sequence. The release conditions are:

Case 1: Deactivate when the event that caused the alarm occurs;

Case 2: Deactivate when the user has acknowledged the alarm.

Case 3: Deactivate when both the event has cleared and the alarm has been acknowledged;

Case 4: Deactivate when either the event has cleared or the alarm has been acknowledged.

Upon entering the subprogram, the system determines if the alarm is active now and was not active on the last pass. (Here "active" means that the event is not clear). If so, the appropriate relays as stored in memory 70 are activated. The system then delays for a brief time, then returns to the start of the subprogram. On this pass the subprogram passes out the "NO" branch of the first decision tree since the alarm was active on the last pass. If the alarm is still active, control passes to the "Has the alarm been acknowledged" decision tree. If the alarm has not been acknowledged, none of the four release conditions can be met, and the system delays then returns to the top of the loop. If the alarm has been acknowledged, the system asks if the system has been programmed for the second case. If so, it deactivates the appropriate relays, delays and returns to the top of the loop. If not it delays and returns. if the alarm is not active, that is it has cleared, on the second or subsequent pass, the system checks to see if the relay is programmed for case 1 or case 4. If so, then the appropriate relays are deactivated. If not, the system must be programmed for case 2 or 3. The system then checks to see if the alarm has been acknowledged. If the alarm has been acknowledged, then we have the case 3 situation and the appropriate relays are deactivated and the system delays and reloops. If the alarm has not been acknowledged, then neither case two or case 3 can be valid, and the system delays and reloops. During the delay period, the control of the system is passed to the taskmaster program, and the system returns to this subprogram only if there is an active alarm.

In the above programs and subprograms, the function keys were used to alter the mode of operation of the system and change the menu and they were used to cause the system to request the user to alter a line of the display, change the state of a toggle (on/off) type variable condition, cause a variable or condition to change to the next variable or condition in a pre-determined list of conditions, or cause the system to request the user to input a predetermined numeric or alphabetic character via the keyboard. It is thus seen that the providing of function keys the labeling and function of which can be changed, opens up a wide variety of applications of the system that were not previously available.

There has been described a fluid detection system that provides a wide variety of changeable and automatically defined function keys. This permits the addition of substantial additional functions of the system without making it more difficult to operate. It is evident that those skilled in the art may now make numerous uses and modifications of the specific embodiments described, without departing from the inventive concepts. For example, other uses of the function keys may be provided. The system may be made with a wide variety of different electronic parts. The display and function keys may take on different shapes, relative locations, and sizes. Consequently, the invention is to be construed as embracing each and every novel feature and novel combination of features present in and/or possessed by the fluid detection system described.

I claim:

1. A fluid status detection system comprising: a controller capable of being operated in a plurality of different operation modes, and a plurality of probes for sensing the status of fluids at probe locations remote from the controller, each of said probes including means for providing a probe signal to said controller indicative of the fluid status at the probe location wherein said plurality of probes include intelligent probes and nonintelligent probes, said controller comprising:

a display that is single color liquid crystal;
   a plurality of key switches adjacent said display;
   key label means for providing labels for said key switches at locations on said display adjacent said key switches;
   label change means for changing said labels at one or more of the label locations when the operation mode of said controller changes;
   help means for providing a different help message on said display in each of said different operation modes.

2. A fluid status detection system as in claim 1 wherein said key label means comprises: key label outline means for defining said label locations, and means for writing text on said display at said label locations.

3. A fluid status detection system as in claim 1 and further including indicating means for indicating when a key switch is activated that is inappropriate in the operation mode in which the system is in.

4. A system as in claim 3 wherein said indicating means comprises an audio means for providing an audio signal.

5. A system as in claim 1 wherein one of said labels is a operation mode label which indicates a operation mode different than the current operation mode and the system further includes mode change means for causing said system to change to the mode indicated on said label when the key switch adjacent said operation mode label is activated.

6. A system as in claim 5 and further including means for changing the menu on said display when said operation mode is changed.

7. A system as in claim 1 wherein one of said labels comprises a go back label, and said system further includes a go back means for causing said system to return to a mode in which it was previously and said display to return to the display previously displayed in said previous mode when the key switch adjacent said go back label is activated.

8. A system as in claim 1 wherein said help means includes display save means for saving the screen displayed on said display when the help means is activated.

9. A system as in claim 8 wherein said help means further includes display restoring means for restoring said saved screen to said display after said help message is removed.

10. The fluid detection system as recited in claim 1 wherein said controller writes to said display two image planes to create fixed screen images.

11. The fluid detection system as recited in claim 1 wherein said key label means and label change means include a help label.

12. The fluid detection system as recited in claim 11 wherein said two image planes comprise: a character image plane and a graphic image plane.

* * * * *